(12) United States Patent
Narahara et al.

(10) Patent No.: US 8,042,136 B2
(45) Date of Patent: Oct. 18, 2011

(54) INFORMATION PROCESSING APPARATUS AND INFORMATION PROCESSING METHOD, AND COMPUTER PROGRAM

(75) Inventors: Tatsuya Narahara, Kanagawa (JP); Tomoyuki Yamamoto, Kanagawa (JP); Kazuhito Sumiyoshi, Tokyo (JP); Hideki Asazu, Tokyo (JP); Toyohiko Shibata, Tokyo (JP); Yasushi Tsuruta, Tokyo (JP); Junya Ohde, Kanagawa (JP); Nobuyuki Fujiwara, Kanagawa (JP)

(73) Assignee: Sony Corporation (JP)

( * ) Notice: Subject to any disclaimer, the term of this patent is extended or adjusted under 35 U.S.C. 154(b) by 424 days.

(21) Appl. No.: 10/557,592

(22) PCT Filed: May 12, 2004

(86) PCT No.: PCT/JP2004/006369
§ 371 (c)(1),
(2), (4) Date: Jun. 21, 2006

(87) PCT Pub. No.: WO2004/107742
PCT Pub. Date: Dec. 9, 2004

(65) Prior Publication Data
US 2006/0250650 A1    Nov. 9, 2006

(30) Foreign Application Priority Data

May 30, 2003   (JP) ............................... P2003-155137
Aug. 29, 2003   (JP) ............................... P2003-306408
Dec. 25, 2003   (JP) ............................... P2003-430756

(51) Int. Cl.
*G06F 3/00*      (2006.01)
*G06F 13/00*     (2006.01)
*H04N 5/445*     (2011.01)

(52) U.S. Cl. ................ 725/52; 725/34; 725/46; 725/54; 725/131; 725/144

(58) Field of Classification Search .................... 725/34, 725/43, 44, 46, 52–54, 105, 131, 144
See application file for complete search history.

(56) References Cited

U.S. PATENT DOCUMENTS
5,353,121 A      10/1994   Young et al.
(Continued)

FOREIGN PATENT DOCUMENTS
EP        721253 A2 *    7/1996
(Continued)

OTHER PUBLICATIONS

Office Action from Japanese Application No. 2003-430756, dated Feb. 23, 2010.

(Continued)

*Primary Examiner* — Brian Pendleton
*Assistant Examiner* — Pinkal R Chokshi
(74) *Attorney, Agent, or Firm* — Lerner, David, Littenberg, Krumholz & Mentlik, LLP

(57) ABSTRACT

Information about each of broadcast programs is subdivided into multiple items including program attributes and the other program association schemes for management. To each item, a relevance ratio with respect to a program is assigned. For example, the next broadcast schedule has the highest relevance ratio with respect to the program, the relevance ratio with respect to the program is high in order of cast, titles, and genre, and so on. Then, a database search is done for programs related to the base program for each item, the search results are arranged in order of decreasing relevance ratio with respect to the base program, and a base program related information page is created. Without deadening a user's interest inspired by watching a program, information related to the program being watched is given, and a user can be guided smoothly to the next preselected recording operation.

32 Claims, 25 Drawing Sheets

U.S. PATENT DOCUMENTS

| | | | |
|---|---|---|---|
| 5,758,259 A * | 5/1998 | Lawler | 725/45 |
| 6,005,597 A * | 12/1999 | Barrett et al. | 725/46 |
| 6,859,803 B2 * | 2/2005 | Dagtas et al. | 1/1 |
| 7,096,483 B2 * | 8/2006 | Johnson | 725/46 |
| 7,209,942 B1 * | 4/2007 | Hori et al. | 709/203 |
| 7,213,256 B1 * | 5/2007 | Kikinis | 725/53 |
| 7,254,829 B1 * | 8/2007 | Brown et al. | 725/141 |
| 7,555,196 B1 * | 6/2009 | Crawford et al. | 386/241 |
| 2001/0027562 A1 * | 10/2001 | Schein et al. | 725/43 |
| 2002/0056095 A1 * | 5/2002 | Uehara et al. | 725/38 |
| 2002/0112239 A1 * | 8/2002 | Goldman | 725/46 |
| 2002/0174429 A1 * | 11/2002 | Gutta et al. | 725/46 |
| 2003/0046696 A1 * | 3/2003 | Mizuno et al. | 725/46 |
| 2003/0061618 A1 | 3/2003 | Horiuchi et al. | |
| 2003/0140342 A1 * | 7/2003 | Hasebe et al. | 725/46 |
| 2003/0237093 A1 * | 12/2003 | Marsh | 725/46 |
| 2004/0221310 A1 * | 11/2004 | Herrington et al. | 725/46 |
| 2005/0086692 A1 * | 4/2005 | Dudkiewicz et al. | 725/46 |
| 2006/0161952 A1 * | 7/2006 | Herz et al. | 725/46 |
| 2006/0236340 A1 * | 10/2006 | DeRosa | 725/39 |
| 2007/0261070 A1 * | 11/2007 | Brown et al. | 725/9 |
| 2008/0155616 A1 * | 6/2008 | Logan et al. | 725/93 |
| 2011/0093884 A1 * | 4/2011 | Wachtfogel et al. | 725/31 |

FOREIGN PATENT DOCUMENTS

| | | | |
|---|---|---|---|
| JP | 6504165 T | | 5/1994 |
| JP | 08-111823 A | | 4/1996 |
| JP | 2001-036846 A | | 2/2001 |
| JP | 2001036846 A | * | 2/2001 |
| JP | 2002-051291 A | | 2/2002 |
| JP | 2002-199294 A | | 7/2002 |
| JP | 2002203168 A | | 7/2002 |
| JP | 2002232372 A | | 8/2002 |
| JP | 2002-354355 A | | 12/2002 |
| JP | 2003-018492 A | | 1/2003 |
| WO | 0033573 A1 | | 6/2000 |
| WO | 0208948 A2 | | 1/2002 |
| WO | 0211440 A2 | | 2/2002 |

OTHER PUBLICATIONS

Supplementary European Search Report EP 04732416, dated Jun. 28, 2010.

* cited by examiner

FIG. 13

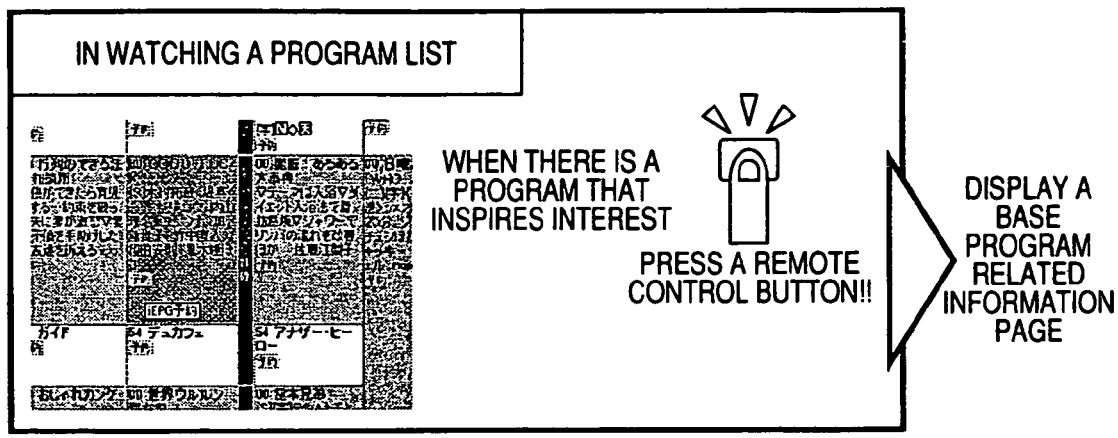

IN WATCHING A PROGRAM LIST

WHEN THERE IS A PROGRAM THAT INSPIRES INTEREST

PRESS A REMOTE CONTROL BUTTON!!

⇒ DISPLAY A BASE PROGRAM RELATED INFORMATION PAGE

FIG. 14

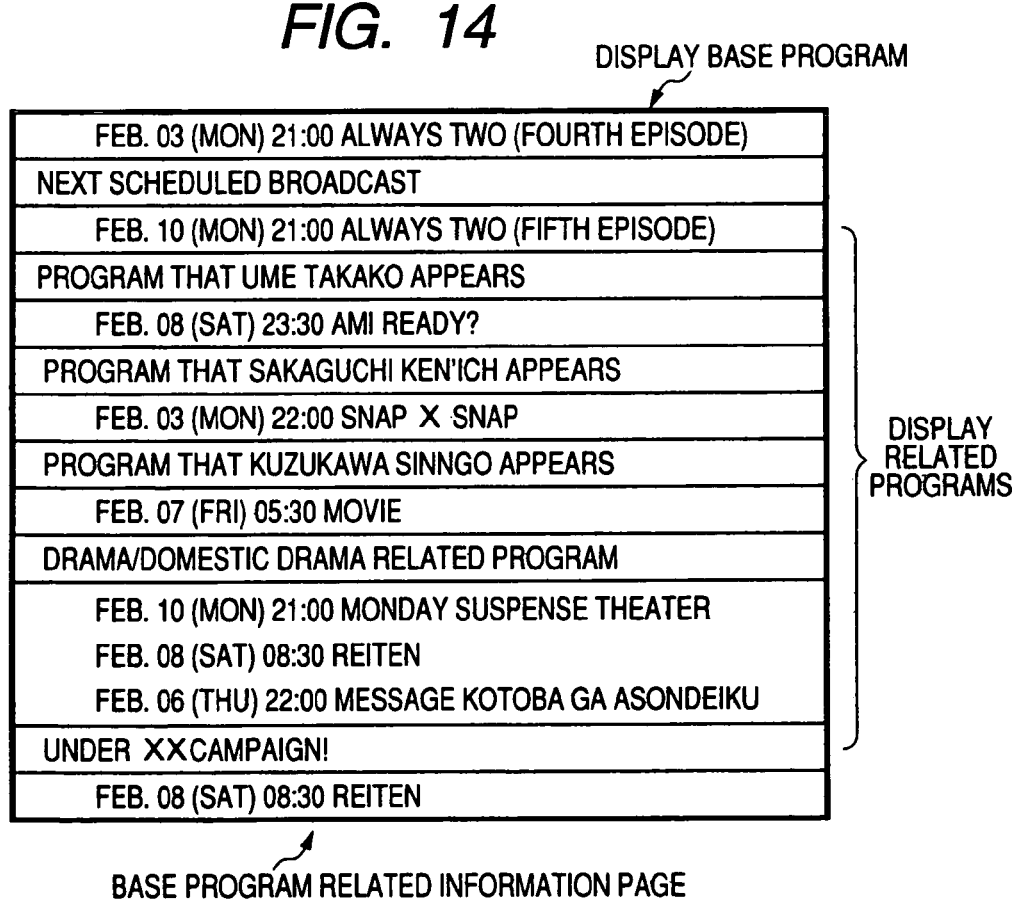

DISPLAY BASE PROGRAM

| FEB. 03 (MON) 21:00 ALWAYS TWO (FOURTH EPISODE) |
| --- |
| NEXT SCHEDULED BROADCAST |
| FEB. 10 (MON) 21:00 ALWAYS TWO (FIFTH EPISODE) |
| PROGRAM THAT UME TAKAKO APPEARS |
| FEB. 08 (SAT) 23:30 AMI READY? |
| PROGRAM THAT SAKAGUCHI KEN'ICH APPEARS |
| FEB. 03 (MON) 22:00 SNAP × SNAP |
| PROGRAM THAT KUZUKAWA SINNGO APPEARS |
| FEB. 07 (FRI) 05:30 MOVIE |
| DRAMA/DOMESTIC DRAMA RELATED PROGRAM |
| FEB. 10 (MON) 21:00 MONDAY SUSPENSE THEATER<br>FEB. 08 (SAT) 08:30 REITEN<br>FEB. 06 (THU) 22:00 MESSAGE KOTOBA GA ASONDEIKU |
| UNDER ××CAMPAIGN! |
| FEB. 08 (SAT) 08:30 REITEN |

DISPLAY RELATED PROGRAMS

BASE PROGRAM RELATED INFORMATION PAGE

*FIG. 16*

| |
|---|
| 23 (SUN) 21:00 TO 21:54 GOGO TOKKYO |
| NEXT SCHEDULED BROADCAST |
|    30 (SUN) 21:00 TO 21:54 GOGO TOKKYO |
| CAST RELATED PROGRAM |
|    NARAHARA TATSUYA |
|       24 (MON) 22:00 TO 22:54 GOGO TOKKYO |
|       24 (MON) 14:00 TO 14:54 (RERUN) DR. AUDIO |
| DRAMA/DOMESTIC DRAMA RELATED PROGRAM |
|    27 (THU) 22:00 TO 22:54 SONY NOW |
|    25 (TUE) 22:00 TO 22:54 OSAKI STORY |
| ANTICIPATION FOR THE NEXT BOOM! |
|    31 (MON) 25:55 TO 26:25 SECRET OF THE PACIFIC OCEAN |
| PEOPLE WHO PRESELECT THIS PROGRAM PRESELECT SUCH A PROGRAM |
|    29 (SAT) 19:00 TO 19:54 DAYS OF INTELLECTUAL PROPERTY MANAGEMENT |
| DVD SOFTWARE |
|    DVD SONY |

- NEXT SCHEDULED BROADCAST
- RELATED INFORMATION
- CAMPAIGN

FIG. 18

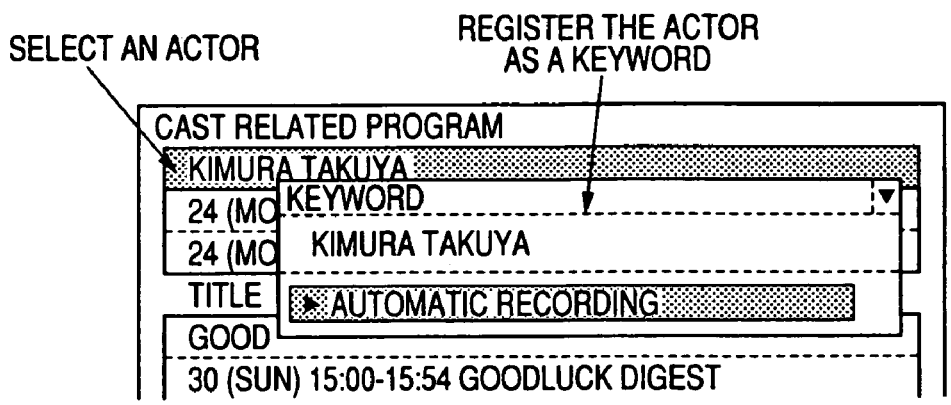

SELECT AN ACTOR
REGISTER THE ACTOR AS A KEYWORD

CAST RELATED PROGRAM
KIMURA TAKUYA
24 (MO) KEYWORD
24 (MO) KIMURA TAKUYA
TITLE
AUTOMATIC RECORDING
GOOD
30 (SUN) 15:00-15:54 GOODLUCK DIGEST

FIG. 19

| FEB. 03 (MON) 21:00 ALWAYS TWO (FOURTH EPISODE) |
| NEXT SCHEDULED BROADCAST |
| FEB. 10 (MON) 21:00 ALWAYS TWO (FIFTH EPISODE) |
| PROGRAM THAT UME TAKAKO APPEARS |
| FEB. 08 (SAT) 23:30 AMI READY? |
| PROGRAM THAT SAKAGUCHI KEN'ICH APPEARS |
| FEB. 03 (MON) 22:00 SNAP × SNAP |
| PROGRAM THAT KUZUKAWA SINNGO APPEARS |
| FEB. 07 (FRI) 05:30 MOVIE |
| DRAMA/DOMESTIC DRAMA RELATED PROGRAM |
| FEB. 10 (MON) 21:00 MONDAY SUSPENSE THEATER |
| FEB. 08 (SAT) 08:30 REITEN |
| FEB. 06 (THU) 22:00 MESSAGE KOTOBA GA ASONDEIKU |
| UNDER ×× CAMPAIGN! |
| FEB. 08 (SAT) 08:30 REITEN |

CAMPAIGN PROGRAM

FIG. 20

| |
|---|
| FEB. 03 (MON) 21:00 ALWAYS TWO (FOURTH EPISODE) |
| NEXT SCHEDULED BROADCAST |
| FEB. 10 (MON) 21:00 ALWAYS TWO (FIFTH EPISODE) |
| SCHEDULED BROADCASTS AFTER THE NEXT |
| FEB. 17 (MON) 21:00 ALWAYS TWO (SIXTH EPISODE) |
| FEB. 24 (MON) 21:00 ALWAYS TWO (SEVENTH EPISODE) |
| MAR. 04 (MON) 21:00 ALWAYS TWO (EIGHTH EPISODE) |
| MAR. 10 (MON) 21:00 ALWAYS TWO (NINETH EPISODE) |
| INTERACTIVE PROGRAM |
| FEB. 10 (MON) 22:00 SNAP X SNAP |
| FOR YOU WHO LIKES MONDAY'S DRAMA AT 9 O'CLOCK |
| FEB. 10 (MON) 22:00 SNAP X SNAP |

INTERACTIVE CAMPAIGN PROGRAM

CAMPAIGN PROGRAM MATCHED WITH PERSONAL TASTE

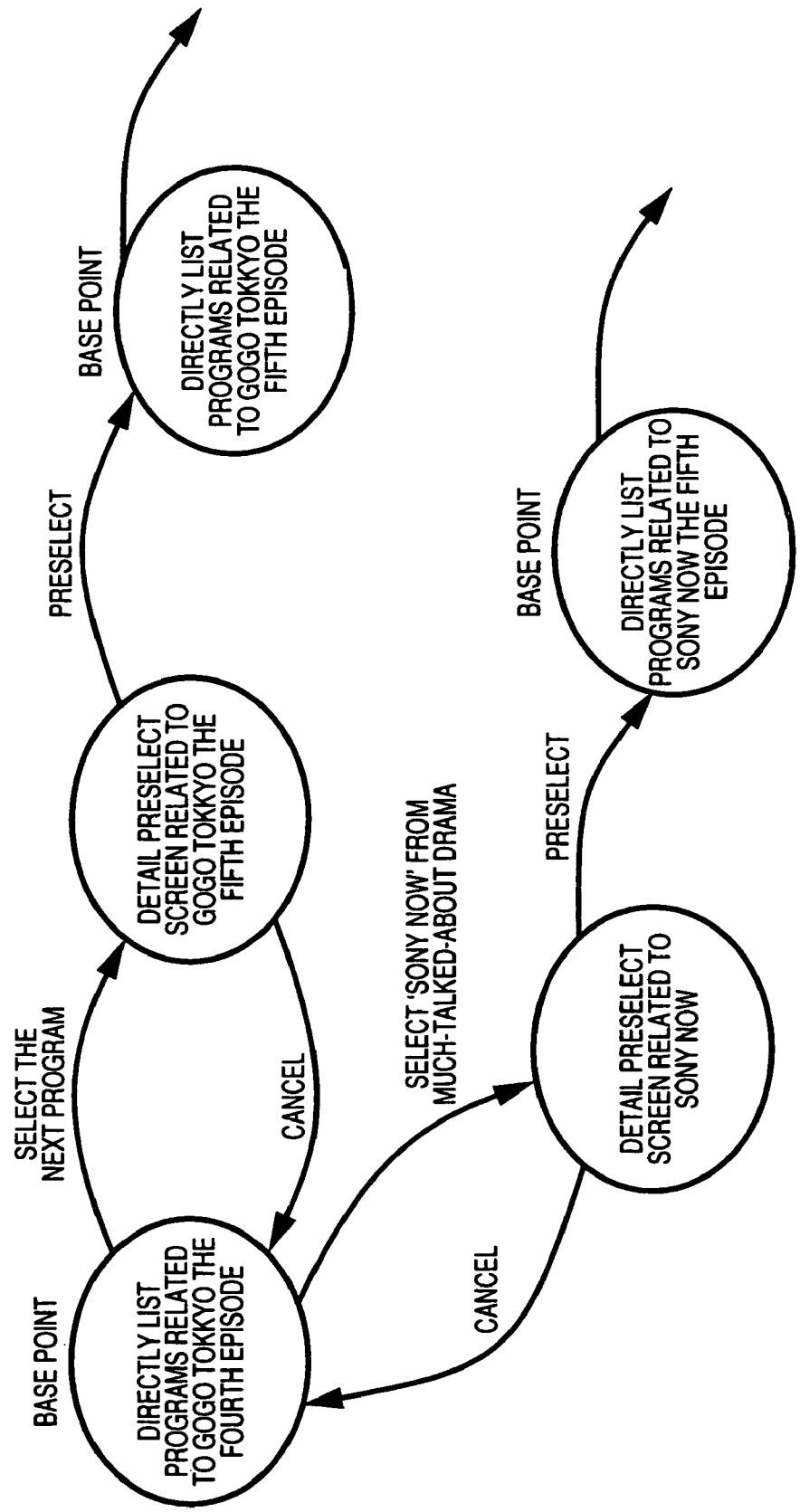

FIG. 25

| | SCHEDULED BROADCAST PROGRAMS | |
|---|---|---|
| | | PRESELECT ALL THE PROGRAMS |
| | JAN. 14 (MON) 22:00 ○○○○ | |
| | JAN. 14 (MON) 22:45 □□□□ | |
| | JAN. 14 (MON) 23:00 △△△△ | |
| | JAN. 15 (TUE) 23:00 XXX FIRST EPISODE | |
| | JAN. 16 (TUE) 23:00 XXX SECOND EPISODE WED | |

FIG. 26

| | SCHEDULED BROADCAST PROGRAMS | | |
|---|---|---|---|
| | | PRESELECT ALL THE PROGRAMS | PRESELECT THE SELECTED PROGRAMS |
| ☐ | JAN. 14 (MON) 22:00 ○○○○ | | |
| ☑ | JAN. 14 (MON) 22:45 □□□□ | | |
| ☐ | JAN. 14 (MON) 23:00 △△△△ | | |
| ☑ | JAN. 15 (TUE) 23:00 XXX FIRST EPISODE | | |
| ☐ | JAN. 16 (TUE) 23:00 XXX SECOND EPISODE WED | | |

FIG. 30

| PROGRAM TITLE | BROADCAST STATION NAME | CANNEL NUMBER | BROADCAST START DATE AND TIME | BROADCAST END DATE AND TIME | RANKING |
|---|---|---|---|---|---|
| ○○○○ | YY BROADCAST | 1 | 2002/01/14/ 22:00 | 2002/01/14/ 22:45 | 1 |
| XXX FIRST EPISODE | TV XX | X | 2002/01/15/ 23:00 | 2002/01/15/ 23:55 | 2 |
| □□□□ | WW BROADCAST | 3 | 2001/01/14/ 22:45 | 2001/01/14/ 23:00 | 3 |
| △△△△ | TV ZZ | 10 | 2002/01/14/ 23:00 | 2002/01/14/ 23:55 | 4 |
| XXX SECOND EPISODE | TV XX | X | 2002/01/16/ 23:00 | 2002/01/16/ 23:55 | 5 |
| XXX THIRD EPISODE | TV XX | X | 2002/01/17/ 23:00 | 2002/01/17/ 23:55 | 6 |
| XXX FOURTH EPISODE | TV XX | X | 2002/01/18/ 23:00 | 2002/01/18/ 23:55 | 7 |

FIG. 31

| PROGRAM TITLE | BROADCAST STATION NAME | CANNEL NUMBER | BROADCAST START DATE AND TIME | BROADCAST END DATE AND TIME | RANKING |
|---|---|---|---|---|---|
| ○○○○ | YY BROADCAST | 1 | 2002/01/14/ 22:00 | 2002/01/14/ 22:45 | 1 |
| XXX FIRST EPISODE | TV XX | X | 2002/01/15/ 23:00 | 2002/01/15/ 23:55 | 2 |
| □□□□ | WW BROADCAST | 3 | 2001/01/14/ 22:45 | 2001/01/14/ 23:00 | 3 |
| △△△△ | TV ZZ | 10 | 2002/01/14/ 23:00 | 2002/01/14/ 23:55 | 4 |
| XXX SECOND EPISODE | TV XX | X | 2002/01/16/ 23:00 | 2002/01/16/ 23:55 | 5 |

FIG. 32

| PROGRAM TITLE | BROADCAST STATION NAME | CANNEL NUMBER | BROADCAST START DATE AND TIME | BROADCAST END DATE AND TIME | RANKING |
|---|---|---|---|---|---|
| ○○○○ | YY BROADCAST | 1 | 2002/01/14/ 22:00 | 2002/01/14/ 22:45 | 1 |
| □□□□ | WW BROADCAST | 3 | 2001/01/14/ 22:45 | 2001/01/14/ 23:00 | 3 |
| △△△△ | TV ZZ | 10 | 2002/01/14/ 23:00 | 2002/01/14/ 23:55 | 4 |
| XXX FIRST EPISODE | TV XX | × | 2002/01/15/ 23:00 | 2002/01/15/ 23:55 | 2 |
| XXX SECOND EPISODE | TV XX | × | 2002/01/16/ 23:00 | 2002/01/16/ 23:55 | 5 |

| | |
|---|---|
| DISPLAY THREE PROGRAMS IN ORDER OF SCHEDULED PROGRAMS OF TOP FIVE PRESELECTED RANKING ||
| | JAN. 14 (MON) 22:00 ○○○○ |
| | JAN. 14 (MON) 22:45 □□□□ |
| | JAN. 14 (MON) 23:00 △△△△ |

INFORMATION PROCESSING APPARATUS AND INFORMATION PROCESSING METHOD, AND COMPUTER PROGRAM

CROSS-REFERENCE TO RELATED APPLICATIONS

The present application is a national stage application under 35 U.S.C. §371 of International Application No. PCT/JP2004/006369, filed May 12, 2004, which claims priority from Japanese Application Nos. P2003-155137, filed May 30, 2003, P2003-306408, filed Aug. 29, 2003, and P2003-430756, filed Dec. 25, 2003, the disclosures of which are hereby incorporated by reference herein.

BACKGROUND OF THE INVENTION

1. Technical Field

The present invention relates to an information processing apparatus, an information processing method, and a computer program which perform processes of recording and reproducing contents, and particularly to an information processing apparatus, an information processing method, and a computer program which aid content processing such as TV program recording, preselected recording, and playback.

More specifically, in consideration of the nature of TV program watching that is passive entertainment, the invention relates to an information processing apparatus, an information processing method, and a computer program which provide information that aids content operations such as TV program search, preselected recording, and playback, and particularly to an information processing apparatus, an information processing method, and a computer program which provide information that aids content operations such as TV program search, preselected recording, and playback, without deadening a user's interest inspired by watching a TV program.

2. Description of Related Art

In modern information civilization society, the role of broadcasts is immeasurable. Most of all, TV broadcasts have a great influence, which directly deliver video information to audiences as well as sounds. Broadcasting techniques include a wide variety of techniques such as signal processing and sending and receiving signals, and information processing of sounds and video. Furthermore, the transmission form that provides program contents to users is in various forms such as a broadcast mode and a cable TV mode by radio waves including ground waves and satellite waves, and network programs offered by using computer communications.

The ownership rate of TV sets is extremely high, and the TV sets are installed in almost all houses. The broadcast contents distributed from individual broadcast stations are watched by an indefinite number of people. Moreover, for another form of watching the broadcast contents, the received contents may be temporarily recorded on the audience side to play it back at any time when desired.

In recent years, with the development of digital techniques, audiovisual data formed of video and sounds can be stored in mass volume. For example, an HDD (hard disk drive) having a capacity of a few tens of GB or greater is available at relatively low cost, and an HDD-based recorder and a personal computer (PC) having functions of recording and watching TV programs are coming.

The HDD is a device that can make random access to recorded data. Therefore, when recorded contents are played back, recorded programs do not need to be sequentially played back from the start as in the case of traditional video-tape, and a desired program (or, a certain scene and a certain part in a program) can be directly started for playback. It is called a 'server-type broadcast' which is a watching form that a receiver (a TV set or a video record/playback device) mounted with a large-capacity storage such as a hard disk device is used, and received broadcast contents are temporarily stored in the receiver for playback.

According to the server-type broadcast system, it allows real time watching such as watching with a typical TV set as well as watching in such ways that video and sounds are distributed beforehand to watch them from the specified time and that information distributed at the same time is used to do scene search or watch a digest.

However, with the realization of the large-capacity HDD, in a system that allows program recording for a few tens of hours, a user can vacillate on selecting which program to watch first when many programs are stored. Then, contents will be a dead stock unless a program that the user desires to watch is efficiently selected to record it or to preselect recording it to aid the user to watch the stored contents. A recording device stores a large volume of the recorded contents therein, and it is difficult to watch all the contents. Thus, selecting is necessary. More specifically, it is considered that efficient preselected recording operations are important for users to enjoy useful activity of watching TV programs.

Here, a so-called electronic program guide (EPG) system is known in which a program guide for selecting programs of television broadcasts is superimposed on a picture signal for transmission, and is displayed on a display device on the receiver side. On the record/playback device side such as an HDD recorder, the EPG is obtained in parallel with recording processing of a broadcast program, and the EPG is shown when a user plays back and watches the recorded program. Therefore, certain watching aid effect can be obtained.

The EPG system has systems of the VBI (Vertical Blanking Interval) mode (for example, see JP-T-6-504165 (U.S. Pat. No. 5,353,121), and the digital satellite mode (for example, see JP-A-111823) that is used in digital satellite broadcast (DSS) (the trademark of Hughes Communication).

In the VBI mode, in television broadcasts of the typical ground wave (VHF (Very High Frequency) band), VBI data configuring the EPG is inserted at the position where an original image of the horizontal scanning lines is not influenced for transmission. On the receiver side, display data of the electronic program guide can be created from the VBI data to display it on a monitor. Furthermore, in the digital satellite mode, EPG data is digitized together with original image data, and is further formed in a packet for transmission. On the receiver side, the EPG data is stored in memory, and corresponding display data is created to display it on a monitor.

A user refers to the EPG distributed as accompanying programs, and then the user specifies or estimates a program desired to watch. However, in this case, it is necessary for the user to do complicated operations in such a way that the user first activates the EPG and searches a program desired to watch on the EPG screen for selection.

For example, when a user desires to search and record a program having high relativity to the program being watched such as the next broadcast program and a program in which the same actor/actress appears, based on the interest inspired in watching a recorded program (or a program now being broadcast), the user needs to activate an EPG screen for search based on days in a week and channels among many programs, or search according to titles and names of cast. In this case, the user needs to suspend watching a TV program to do a search operation for the program to be recorded.

Moreover, program related information is often provided on an official web site of the program through a medium such as the Internet. However, in order to browse detail information, complicated operations need to be done in such a way that a web browser is activated to enter a URL, and thus the interest to the TV program inspired through watching is diverted.

Watching TV programs inherently has the nature of passive entertainment. On the other hand, searching for a program to be preselected for recording requires users to do active operations, causing the interest inspired by watching programs to be deadened by the program search operations.

SUMMARY OF THE INVENTION

An object of the invention is to provide an excellent information processing apparatus, an information processing method, and a computer program which can preferably aid content processing such as program recording, preselected recording, and playback.

Another object of the invention is to provide an excellent information processing apparatus, an information processing method, and a computer program which can preferably aid content operations such as program searching, preselected recording, and playback in consideration of the nature of program watching that is passive entertainment.

Still another object of the invention is to provide an excellent information processing apparatus, an information processing method, and a computer program which can preferably aid content operations such as program searching, preselected recording, and playback without deadening a user's interest inspired by watching a TV program.

Yet another object of the invention is to provide an excellent information processing apparatus, an information processing method, and a computer program which can provide program related information related to a program watched by a user and can preferably aid content operations such as program searching, preselected recording, and playback, and the other user's activities, without deadening a user's interest inspired by watching a TV program.

The invention has been made in view of the problems. A first aspect thereof is an information processing apparatus which provides information related to program contents distributed in accordance with scheduled times, the information processing apparatus including a base program setting module operable to set a base program in accordance with an operation by a user with respect to contents; a base program related information creating module operable to create a base program related information page including program information related to the base program; a page display control module operable to control the display and output of the base program related information page; a user input module operable to select a user selection of a related program or item of the base program on the displayed base program related information page; and a detail screen presentation module operable to present a detail operation screen that includes an operation scheme applicable to detail information for the related program selected by the user and/or the related program.

Here, the base program setting module sets as the base program the program contents that the user is playing back or watching, or the program contents selected from a predetermined program list such as an EPG. Then, the base program related information creating module searches programs related to the base program for each item based on the relevance ratio with respect to the base program, arranges a search result of the related programs in order of items having a decreasing relevance ratio with respect to the base program, and creates the base program related information page. The user can activate a browser to browse the base program related information page, and perform operations such as preselected recording with respect to the programs related to the base program.

User taste information may be acquired based on user content operation history and user questionnaire results, and then the page display control module which displays the base program related information page may present related information matched with the user taste information.

Therefore, according to the invention, the program that the user is currently watching or playing back is set to a base point, and the other programs related thereto are introduced in order of a decreasing relevance ratio. Thus, without deadening the user's interest inspired by watching a TV program or listening to a radio program, the content operations such as TV and radio program search, preselected recording, and playback can be smoothly and preferably aided. More specifically, in consideration of the nature of program watching that is passive entertainment, the content operations such as TV program search, preselected recording, and playback can be smoothly aided along the flow of watching programs.

Furthermore, according to the invention, in response to a simple operation of operating a button on a user's remote control, related information about the program that the user is watching is sequentially shifted to present many items of information. Thus, without deadening the user's interest inspired by watching a program, the user is guided to related information, and further guided to related information about the related information smoothly. Therefore, the user's various interests can be inspired.

According to the invention, for example, a service can be implemented that provides information related to a TV or radio broadcast program that the user is watching, recording or playing back (that is, the base program). Such an information providing service system is, for example, configured of a broadcast receiver terminal or a broadcast receiver terminal with a recording function which is connected to a network, and a server device on the network. Then, the broadcast receiver terminal sends program specification information which specifies the contents being watched to the server device. On the server device side, information related to the program is searched based on program specification information, the search result is used to create a program information page, and the page is sent back to the broadcast receiver terminal.

Alternatively, as a modification of this information providing service system, related information of a program is sent to the broadcast receiver terminal before the user watches the program via a broadcast network or the network, and is stored beforehand in the broadcast receiver terminal. Then, in the broadcast receiver terminal, when watching the program contents, in response to the user's instruction, stored related information may be retrieved using program specification information such as broadcast channels, broadcast date and time, and broadcast areas as keys for presentation to the user.

In order to create base program related information, for example, program attributes of each of the program contents such as 'next broadcast schedule', 'cast', 'title', and 'genre', and the other program association schemes are subdivided into multiple items for database management. Then, for example, program information is managed in a database, the information is assigned a relevance ratio with respect to the base program in order of 'next broadcast schedule', 'cast', 'title', and 'genre'.

Then, the base program related information creating module can search the database of the program contents for programs related to the base program for each item, arrange the search result of the related programs in order of items having a decreasing relevance ratio with respect to the base program, and create a base program related information page.

Here, when the same program contents are extracted as a related program to the base program on two or more items, the base program related information creating module or the page display control module may omit display of that related program after a second time, and many related programs may be presented in the limited page display screen. Besides, the page display control module may adjust the number of related programs for each item for display and output in a fixed page size.

The operation scheme applicable to each of the related programs, for example, may include preselected recording schemes such as 'recording at this time', 'weekly recording', and 'daily recording'. Then, a button which selects any one of the preselected recording schemes is arranged on the detail operation screen, and the related program is set for preselected recording based on the selected preselected recording scheme.

Furthermore, even though a user is interested in multiple or all the programs presented on the base program related information page, the user has to sequentially do 'preselected recording' for each of them. Then, for the preselected recording scheme, one of the following schemes may be prepared: a scheme in which all the related programs arranged on the base program related information page are collectively set for preselected recording; and a scheme in which programs selected by a user among the related programs arranged on the base program related information page are collectively set for preselected recording. When the former preselected recording scheme is selected, the user can set multiple or all the interested programs for preselected recording by a single action of 'preselected recording'.

Moreover, a module may be further included which registers the item selected by the user on the displayed base program related information page as a keyword. The keywords in this case, for example, can be used for a preselected recording scheme that records all the program contents hit for the keywords.

Furthermore, a base program shifting module may be further included which shifts the base program in response to a user operation. In this case, the base program related information creating module again creates a base program related information page in response to the shift of the base program to the related program. Thus, without deadening the user's interest inspired by watching a TV program, content operations such as program search, preselected recording, and playback can be smoothly aided, with no interruption of the flow of watching the program.

In response to selecting a related program as a base program on the detail operation screen, the base program shifting module may shift the base program to that related program.

Alternatively, in response to setting a related program for preselected recording on the detail operation screen, the base program shifting module may set that related program to a base program.

Alternatively, in response to setting that related program for playback on the detail operation screen and playback operation is stopped or finished, the base program shifting module may set that related program to a base program.

When the shift of the base program is accepted, the detail of the old base program related information page is lost each time. However, depending on the users, a user sometimes desires to again browse the previous base program related information page, or desires to have the remaining related programs shown in detail in the previous base program related information page. Then, the display history of the base program related information page is stored. Besides, history buttons may be prepared on the base program related information page which instruct the reload of the base program related information being displayed, displayed at a previous time, or displayed at a time after the previous time. Alternatively, the tile of that program may be partially displayed on the history button.

Furthermore, the base program setting module extracts information that specifies at least the broadcast date and time and the broadcast station of the base program, and an area to receive contents as program specification information.

On the server device side where base program related information is created and provided, in relating the program contents to related information, the difference in specification information of the same program caused by the difference in the broadcast circumstances in each area can be solved by having broadcast date and time modification information about broadcast stations and programs for each area, and related information may be uniquely associated with the same program specified by program specification information varied in each broadcast area.

Here, it is likely to present the base program related information page shifted before or after on a time basis. The situations below can be considered as the cases where the base program related information page shifted before or after on a time basis is presented.

(1) The case where a user finishes watching a program and desires to make access, but the program has already been switched on the EPG. In this case, it is the correct operation on design, but when seen from the viewpoint of the user, the user can have the impression that the program the user desires to watch is not displayed, but the base program related information page for the subsequent program is displayed.

(2) The case where time setting of the terminal is incorrect to delay time in the terminal. In this case, at the point in time when information about the base program is up to the server, time information of the base program is incorrect in matching time information of the base program with EPG information. Therefore, it is likely to detect a wrong program.

Then, a user input module may be further included, which accepts the user's instruction to search for the base program on the display screen of the base program related information page; wherein in response to a user operation, the base program shifting module searches for the base program and shifts the base program based on a predetermined search condition.

For example, in response to a user operation to conduct a forward search on a time basis, the base program shifting module may search for a program in the same broadcast station as the base program currently set, having a maximum broadcast end date and time equal to or below a current broadcast start date and time, and shift the base program to the extracted program. This is equivalent to a shift to the program right before on the program list (the radio and TV programs column) of a newspaper where the horizontal axis is broadcast stations and the vertical axis is broadcast hours.

Alternatively, in response to a user operation to conduct a backward search on a time basis, the base program shifting module may search for a program in the same broadcast station as the base program currently set, having a minimum broadcast start date and time equal to or above a current broadcast end date and time, and shift the base program to the extracted program. This is equivalent to a shift to the program right after on the program list (the radio and TV programs column) of a newspaper.

According to the search for TV programs of the embodiment, although the base program related information page shifted before or after on a time basis might be presented, the shift operation of the base program allows a shift to the base program related information page to be displayed originally. Besides, for the user interested in the program shifted before or after on a time basis, the requested base program related information page can be presented.

Moreover, the base program related information creating module uses the related programs in the order of items having a decreasing relevance ratio with respect to the base program to create the base program related information page. However, at this time, suppose the contents that have already finished being broadcast or already recorded are not distinguished from the contents that are scheduled for broadcast and that are not yet set for preselected recording, and they are evenly presented based only on ranking of the relevance ratio. This is not always preferable as a recommendation and watching aid scheme with respect to volatile contents like the broadcast contents.

Then, the base program related information creating module may create a base program related information page which presents programs of the latest broadcast schedule on a priority basis. For example, a list in which programs are sorted in accordance with a certain criterion such as a ranking form is first created, the programs are filtered to those having a certain level (rank) or above on the list, and the programs having the latest broadcast schedule are rearranged for presentation. For example, the programs are filtered to those of the top three in the program preselected ranking, and the programs which are highly interesting and the latest are presented on a priority basis.

In this manner, the programs of the latest broadcast schedule are presented on a priority basis among many programs, and thus efficient program presentation can be made even under the inherent limitation of a CE device with a small display area. This is because the programs of the latest broadcast schedule are presented on a priority basis when a user accesses the system on a regular basis. Thus, missing programs for display are reduced, and consequently, the number of programs presented to the user is increased. It can be considered to be more preferable as a recommendation and watching aid scheme for volatile contents like broadcast contents.

For example, in confirming the schedule of broadcast scheduled programs and the programs that the user accesses for presentation, the number of broadcast scheduled programs for display is three. Then, the scheme that displays programs of the latest broadcast schedule on a priority basis is compared with the scheme that presents programs at random (or in accordance with a ranking other than broadcast schedule). According to the former scheme, the number of programs to be displayed in a predetermined period is increased.

Furthermore, the base program related information creating module may present a special content when a predetermined condition is matched on the base program related information page.

For a special content for presentation, program information exceeding the period provided by the EPG, interactive programs as campaigns, and contents that are matched with personal taste at the maximum are displayed. In addition, as a special condition, there is the case where all the programs presented on the base program associated page are in the same broadcast station. Alternatively, it may be the case where a value reaches the same value as a special value; the case where the result that the broadcast hours of the program presented on the base program associated page are added is the same value as a special value, and the case where the number of accesses by users reach just ten thousand times in total.

In this manner, the special content is provided as well as program related information, without deadening the user's interest inspired by watching a program, the user is guided to related information, and further guided to related information about the related information smoothly. Therefore, the user's various interests can be inspired.

Moreover, the program information management module which manages program information may manage information associated with every program as well as manage information associated with a given portion of a program.

In this case, in addition to creating a base program associated page from program information associated with the base program based on the program specification information, the base program information creating module may take program information associated with a given portion of the base program where the content operation is performed by the user, and use that program related information to create a base program related information page.

The program information management module can associate information with an entire program as well as a given portion of a program. For example, a single program is divided into multiple blocks, information is associated with each block, and then program related information can be provided in more detail. Of course, information can be associated not only with the main part of the program but also with a broadcast commercial inserted into the program contents. In addition, the user can operate a remote control, for example, to specify a given portion of the program in watching, and can request the provision of information related thereto.

In this manner, information is associated with a given portion of a program, not by the program, and thus the range of the service to provide program related information is increased.

According to the system of providing program related information of the invention, independent from the intention of producers and sponsors of programs, a provider of program related information associates information with a given portion of a program to allow the provision of a wide variety of services by the provider's will regardless of a certain limit.

Here, the base program information creating module may create a base program related information page which uses at the same time program information associated with the entire base program and program information associated with a specific portion of the base program, that is, program information is arranged in parallel for display.

Furthermore, the program information management module may store the information content main part associated with a program as information related to an entire program or a given portion of a program as well as manage, as program related information, keywords and resource identification information such as URLs and URIs that can be used to search for program related information on a predetermined information space, such as WWW on the Internet. In this case, the base program information creating module can use resource identification information obtained based on program specification information or a keyword to search for program related information on the WWW information space, and create a base program related page.

Moreover, the program information management module may manage related information about another portion of the same program, another program, or a given portion of another program as information related to an entire program or a given portion of a program. In this case, in response to a user operation with respect to related information about another portion of the same program, another program, or a given portion of another program on a base program related information page, the module may activate playback of that program or program portion.

Furthermore, a search is made as to whether there is information associated with a program or program portion currently being watched or played back. When there is associated information, indication information which indicates the related information is presented to a user on a screen. Thus, the user may be encouraged to use related information.

Here, on the server device side where program related information is created and provided, in relating program contents or a given portion of program contents to related information, the difference in the specification information of the same program caused by the difference in the broadcast circumstances in each area can be solved by having broadcast date and time modification information about broadcast stations and programs for each area, and related information may be uniquely associated with the same program specified by the program specification information varied in each broadcast area.

Moreover, the program information management module may specify a given portion of program contents based on the elapsed time from the beginning of the contents, and associate the portion with related information.

Furthermore, a second aspect of the invention is a computer program which is described in a computer readable form so as to implement a process of providing information related to program contents distributed in accordance with scheduled times on a computer system, the computer program including setting a base program to be a base point for operations; creating a base program related information page including program information related to the base program; displaying and outputting the base program related information page; accepting a user selection of a related program or item of the base program on the displayed base program related information page; and presenting a detail operation screen that includes an operation scheme applicable to detail information for the related program selected by the user and/or the related program.

The computer program according to the second aspect of the invention defines a computer program in computer readable form so as to implement a predetermined process on the computer system. In other words, the computer program according to the second aspect of the invention is installed in the computer system to exert cooperative effects on the computer system, and thus the same operations and advantages can be obtained as those of the information processing apparatus according to the first aspect of the invention.

According to the invention, an excellent information processing apparatus, an information processing method, and a computer program can be provided which can preferably aid content processing, such as TV program recording, preselected recording, and playback.

Moreover, according to the invention, in consideration of the nature of program watching that is passive entertainment, an excellent information processing apparatus, an information processing method, and a computer program can be provided which can preferably aid content operations, such as TV program search, preselected recording, and playback.

Furthermore, according to the invention, without deadening the user's interest inspired by watching a TV program, an excellent information processing apparatus, an information processing method, and a computer program can be provided which can preferably aid content operations, such as TV program search, preselected recording, and playback.

Moreover, according to the invention, without deadening the user's interest inspired by watching a TV program, an excellent information processing apparatus, an information processing method, and a computer program can be provided which can provide program related information related to a program watched by the user, and can preferably aid content operations such as TV program search, preselected recording, and playback, and the other user's activities.

Other objects, features and advantages of the invention will be apparent from the detailed description based on an embodiment according to the invention and the accompanying drawings.

BRIEF DESCRIPTION OF THE DRAWINGS

FIG. 13 is a diagram depicting a manner in which a user watching program contents with the broadcast receiver terminal inputs a base program by operating a remote control.

FIG. 14 is a diagram depicting an exemplary configuration of a base program related information page.

FIG. 16 is a diagram depicting another exemplary configuration of the base program related information page.

FIG. 18 is a diagram depicting a manner in which a certain actor is selected as a keyword.

FIG. 19 is a diagram depicting an exemplary configuration of a base program related information page on which information about a campaign program is displayed as special contents.

FIG. 20 is a diagram depicting an exemplary configuration of a base program related information page on which information about a campaign program is displayed as special contents.

FIG. 21 is a diagram depicting an exemplary procedure of shifting a base program through operations on a detail screen.

FIG. 25 is a diagram depicting an exemplary screen configuration of collectively setting preselected recording of all the related programs arranged on the base program related information page.

FIG. 26 is a diagram depicting an exemplary screen configuration of setting preselected recording of only a program selected by a user among the related programs arranged on the base program related information page.

FIG. 30 is a diagram depicting an exemplary configuration of a program list based on the ranking result obtained by sorting programs in accordance with a certain criterion.

FIG. 31 is a diagram depicting a manner that deletes items other than the top five in the program list shown in FIG. 30.

FIG. 32 is a diagram depicting a manner that again sorts the program list shown in FIG. 31 in order of the latest broadcast.

DETAILED DESCRIPTION

Figure 1:
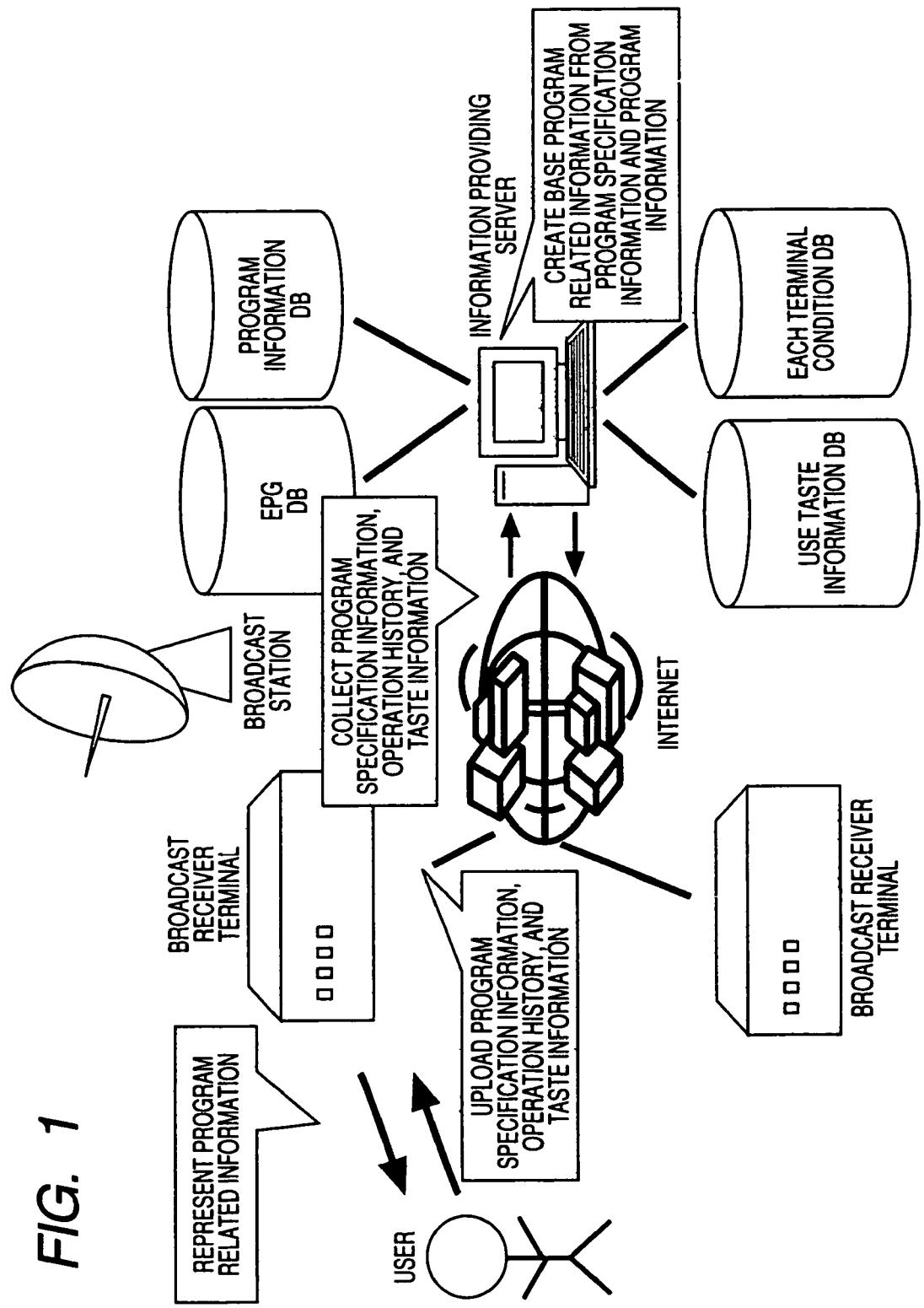
FIG. 1 is a diagram schematically depicting the configuration of an information providing system which provides broadcasts of program contents and information related to the program contents, configured by applying the invention thereto.

Hereinafter, an embodiment of the invention will be described in detail with reference to the drawings.
System Configuration FIG. 1 schematically depicts the configuration of an information providing system which provides broadcasts of program contents and information related to the program contents which is configured by applying the invention thereto.

The information providing system according to the embodiment manages information related to programs in a database, in which the system sets a program that a user is currently watching or playing back to a base point to provide a base program related information page that introduces other programs related to the base program in order of a decreasing relevance ratio, and thus the system can preferably aid content operations such as program searching, preselected recording, and playback of TV programs and radio programs without deadening a user's interest inspired by watching a TV program and a radio program.

Furthermore, the information providing system according to the embodiment manages information associated with every program as well as manages information associated with a given portion of a program in a database, in which the system uses information associated with a given portion that has been operated by a user in a program being watched or played back to create a base program related information page, and thus the system can provide program related information in more detail. Of course, the system can associate information with the main part of programs as well as with a broadcast commercial inserted into the program contents.

In the example shown in the drawing, the information providing system is configured of a broadcast station such as a TV station and a radio station which distributes program contents through predetermined broadcast waves, multiple broadcast receiver terminals which serve as a content record/playback device that receives, records and plays back broadcast contents by individual users, and a server which provides program related information related to contents being watched or played back with respect to the broadcast receiver terminal.

The broadcast station is placed throughout in each area, which distributes program contents via broadcast waves as time schedule in accordance with a predetermined program list.

The broadcast receiver terminal (hereinafter, it is also called a client) is interconnected to the server via a wide area network such as the Internet or a communication path in another form. Moreover, the server is connected to broadcast stations, producers of program contents, sponsors of program broadcasts, or other information providers through a backbone (not shown), which sequentially acquires program related information associated with program contents to be broadcast or a given portion of program contents.

The broadcast receiver terminal as a client is configured to be combined with a CE (Consumer Electronics) device such as a set-top box and a TV set, or to be externally connected to a personal computer with a tuner function, which has a contents record/playback function to store program contents to be broadcast by the hour from each of the broadcast stations in accordance with a preselected recording setting by user operations, or a predetermined automatic preselected recording procedure.

The broadcast receiver terminal acquires program specification information which identifies program contents or a specific portion in a program in receiving and recording broadcast contents, operation information and watching history information related to recording and playback of contents, user taste information, user profile information, etc.

Furthermore, the broadcast receiver terminal is connected to a wide area network such as the Internet, which sends (uploads) program specification information and user taste information to an information providing server constructed on the network as well as receives program related information related to program contents being watched or played back or a given portion of the contents from the information providing server.

More specifically, data to be a target for upload from the client to the server is program specification information which specifies a program that a user watches or plays back on the broadcast receiver terminal, user program watching history information which a user has recorded, preselected for recording, and watched, user taste information, etc. Among them, program specification information is formed of a format of broadcast date and time, broadcast channel, and area information, for example, which is uploaded when a user requests program related information, for instance.

On the other hand, the information providing server has an EPG database for broadcast programs that are broadcast on each of the broadcast stations, a program information database which manages program information associated with program contents or a given portion of the contents, a user taste information database which manages taste information and profiles of individual users by the user, and a terminal condition database which manages conditions of each user's broadcast receiver terminal.

On the information providing server side, when a user's broadcast receiver terminal requests program related information, the EPG database is referenced to identify the relevant program based on program specification information uploaded with this request, and the relevant program information is taken out of the program information database. Then, the obtained program information is used to create a program related information page for the user. When creating the program related information page, related information may be presented in accordance with user taste information.

Figure 2:
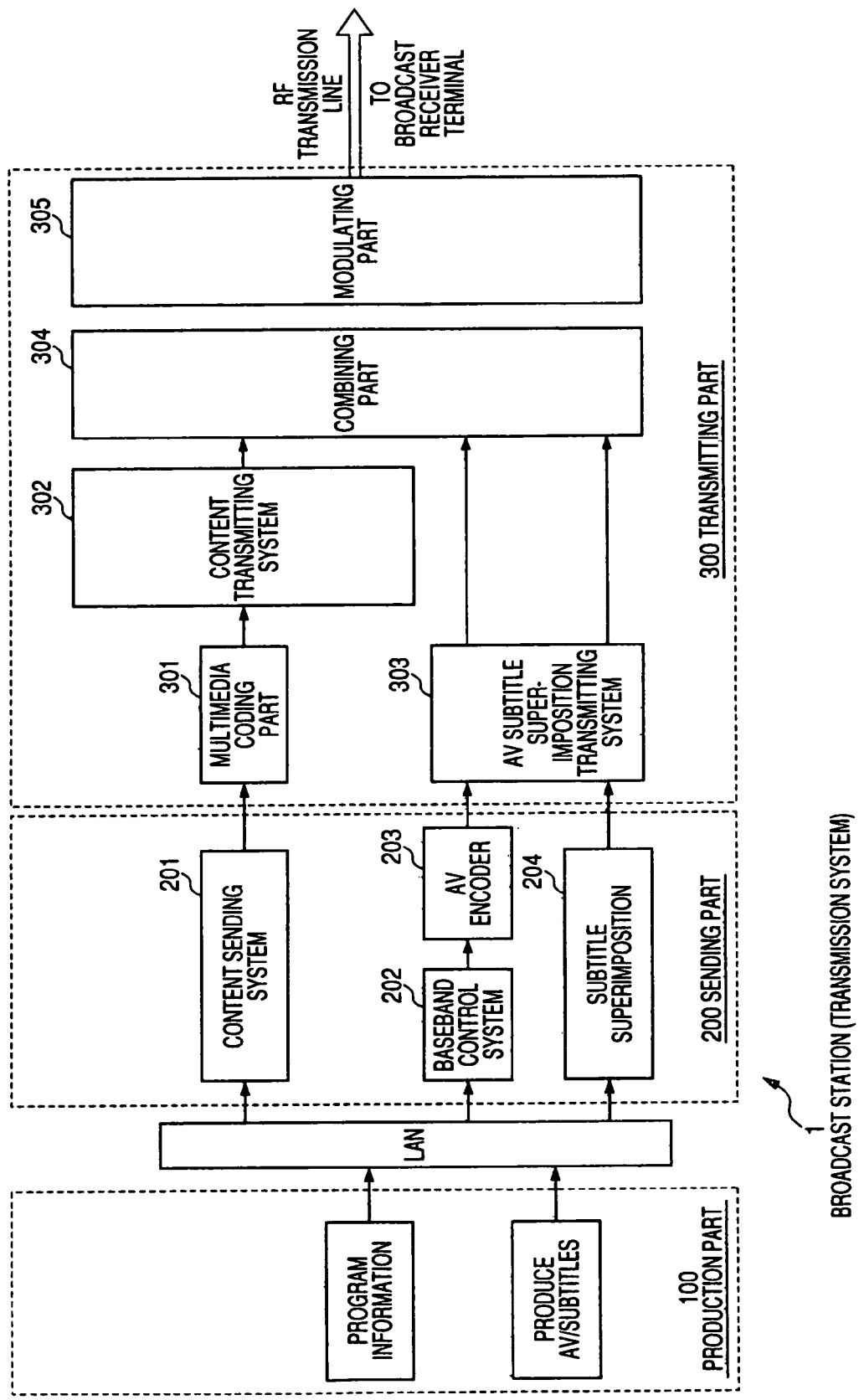
FIG. 2 is a diagram schematically depicting the system configuration of sending broadcast contents in a broadcast station.

FIG. 2 schematically depicts the system configuration which sends broadcast contents in the broadcast station. A transmission system 1 is configured of a production part 100, a sending part 200, and a transmitting part 300. Hereinafter, each part will be described.

The production part 100 corresponds to a site which produces individual contents of broadcast program information to be sent as broadcast contents. More specifically, the production part 100 produces individual streams such as video and audio streams that configure a broadcast program, data such as subtitles, and each of resource elements such as EPG.

The broadcast contents configured of program information and a program main part formed of the individual streams such as video and audio streams are transferred to the sending part 200 via a LAN (Local Area Network), for example, constructed in the broadcast station 1.

In the sending part 200, each of a content sending system 201, a baseband control system 202, an AV encoder 203, and a subtitle superimposition 204 forms send data in packets to pass the packets to the transmitting part 300.

In the transmitting part 300, program information is encoded in a multimedia coding part 301, and is passed to the content transmitting system 302. A combining part 304 combines output data of each of the content transmitting system 302 and an AV subtitle superimposition transmitting system 303. Then, in a modulating part 305, the combined signals are RF modulated and sent to the receiver (broadcast receiver terminal) 10 through an RF transmission line.

In the RF transmission line, the RF signal is first sent from a sending antenna installed in the broadcast station 1 to a broadcast satellite 5, and then received by a receiving antenna of the receiver 10 via a transmission line.

In addition, in the example shown in FIG. 2, a TV broadcast station is considered. However, the services of providing program related information according to the invention can of course be applied to radio broadcasting and broadcast services in other forms as well. Furthermore, any broadcast waves are applicable, not limited to the ground wave and the satellite wave.

Figure 3:
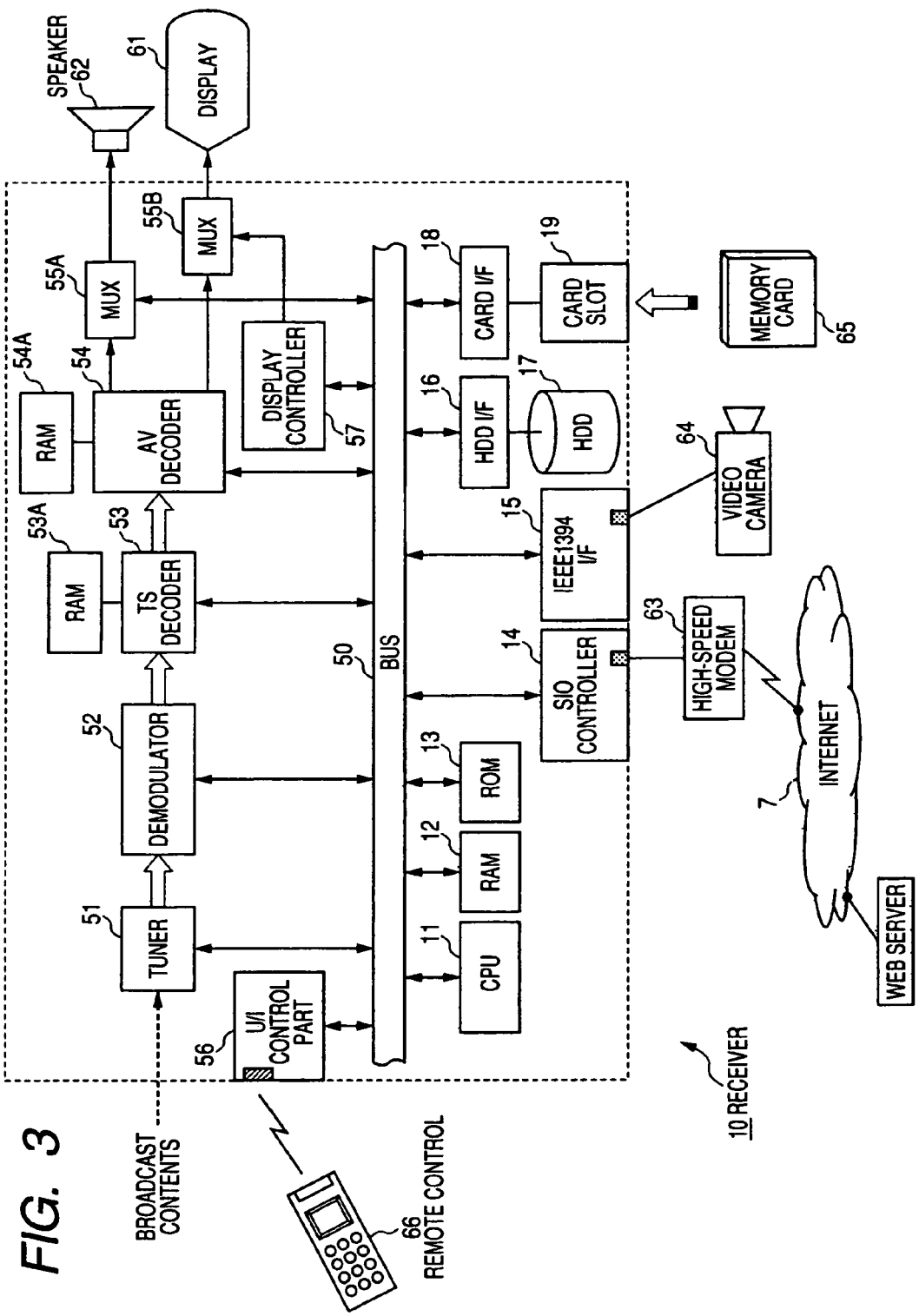
FIG. 3 is a diagram schematically depicting an exemplary hardware configuration of a broadcast receiver terminal which receives broadcast contents for recording and preselected recording.

FIG. 3 schematically depicts an exemplary hardware configuration of the broadcast receiver terminal 10 which receives broadcast contents for recording and preselected recording.

In the receiver 10, a CPU (Central Processing Unit) as a main controller is interconnected to individual hardware components through a bus 50 to implement centralized control over each component. Hereinafter, each part will be described.

The broadcast wave received by an antenna (not shown) is supplied to a tuner 51. The broadcast wave conforms to a defined format, but it may be cable broadcast waves and ground waves not limited to the broadcast wave for satellite broadcasting above, which is not limited particularly.

The tuner 51 tunes, that is, dials the broadcast wave of a predetermined channel in accordance with an instruction from the CPU 11, and outputs received data to a subsequent demodulator 52. The demodulator 52 demodulates received data that is digitally modulated. In addition, the configuration of the receiver 10 can be modified or expanded properly in accordance with analog or digital broadcast waves to be sent.

The demodulated digital data is a transport stream (TS) formed by multiplexing audiovisual data compressed by the MPEG2 mode with program information, for example. The former audiovisual data is configured of video and sound information that forms a broadcast program main part, and subtitle data. The latter program information is data accompanying this broadcast program main part, which is used for an EPG and preselected recording of programs.

A TS decoder 53 interprets the transport stream, separates it into audiovisual data compressed by the MPEG2 mode and program information, and sends the former to an AV decoder 54 and the latter to the CPU 11 via the bus 50. The TS decoder 53 may locally have report data storage memory 53A therein.

When the AV decoder 54 receives real time audiovisual data compressed by the MPEG2 mode from the TS decoder 53, it separates the data into compressed video data and compressed sound data. Then, it elongates video data for processing in accordance with the MPEG2 mode and reproduces original video signals, whereas it decodes sound data by PCM (Pulse Code Modulation) and combines the data with additional sounds to form reproduced sound signals. The AV decoder 54 may locally have report data storage memory 54A therein. The reproduced video signal is outputted for display on a display 61 through a multiplexer 55B, and the reproduced sound signal is outputted to a speaker 62 through a multiplexer 55A. Alternatively, for the broadcast contents of a program preselected for recording, compressed video data and compressed sound data are not elongated, and they are transferred to a hard disk device 17 via the bus 50 to be temporarily recorded. In this case, when watched, they are read out of the hard disk device 17, again elongated by the AV decoder 54, and outputted for playback.

A user interface control part 56 is a module that processes input operations by a user, which, for example, has operation buttons/switches (not shown) that the user directly operates manually, and a function to accept remote operations from a remote control 66 through infrared (IR) rays. Moreover, it may include a display panel and an LED indicator (not shown) that display the details of setting at present. The user can perform content operations through the remote control 66 and the user interface control part 56, including the tuning, recording, preselected recording, and playback of the broadcast program, and the deletion of recorded programs.

In the embodiment, in addition to a group of typical terminal operation buttons for tuning, volume control, recording and playback, the remote control 66 has an 'information button' which is a button exclusive for instructing related information presentation.

The CPU 11 is a main controller which controls the entire operation of the receiver 10. Furthermore, the CPU 11 can perform processes of recording, preselected recording, and playback for program information transferred via the bus 50.

RAM (Random Access Memory) 12 is writable volatile memory that is used for loading executing program codes for the CPU 11 and for writing report data of an executing program. Moreover, ROM (Read Only Memory) 13 is read only memory that permanently stores a self-diagnostic program and/or an initialization program run when power of the receiver 10 is turned on and stores microcodes for hardware operations.

A serial input/output (SIO) controller 14 is a peripheral controller which performs serial data interchange with external devices of the receiver 10. To a serial port provided by the SIO controller 14, a high-speed modem 63 which modulates and demodulates transmission data on an analog telephone line is externally connected. The high-speed modem 63 is connected to a predetermined access point (not shown) by PPP (Point-to-Point Protocol) (or connected in the other formats) to connect the receiver 10 to the Internet 7 as a wide area network, and an upper link to the information providing server can be formed.

An IEEE (Institute of Electrical and Electronics Engineers) 1394 interface 15 is a serial high-speed interface that can send and receive data of about a few hundreds MBps. To an IEEE 1394 port, external devices conformed to IEEE 1394 can be connected in daisy chaining or tree connection. For IEEE 1394 conformed devices, a video camera 64 and a scanner (not shown) are named, for example.

The hard disk drive (HDD) 17 is an external storage device that stores programs and data in file formats in predetermined formats, which has relatively large capacity of about a few tens to a few hundred GB. The HDD 17 is connected to the bus 50 through a hard disk interface 16. In the embodiment, the HDD 17 is used for recording, preselected recording, and playback of the received broadcast program and for storing program related information.

A card interface 18 is a device that implements bus protocols between a card type device 65 mounted on a card slot 19 and the bus 50. An example of the card type device 65 is a PC card in credit card size formed in a cartridge type.

A display controller 57 is an exclusive controller that controls display and output of broadcast program information based on data broadcast contents.

The receiver 10 controls the tuning operation of the tuner 51 in accordance with a user input command through user interface control part 56, and controls display of program information. More specifically, the CPU 11 processes program information transferred from the TS decoder 53, transforms it into display data, and supplies it to the display controller 57. The display controller 57 creates picture signals of program information based on the display data, and supplies the signals to the multiplexer 55B.

Furthermore, the CPU 11 also processes sound data included in program information, and supplies it to the multiplexer 55A via the bus 50. The multiplexers 55A and 55B multiplex each of display data and sound data supplied from the CPU 11 with video data and sound data (and subtitles) as the broadcast program main part outputted from the AV decoder 54, and output the data to the display 61 and the speaker 62.

Moreover, the CPU 11 controls the playback operation, recording operation and preselected recording operation of the received broadcast program, and the delete operation of recorded programs.

The broadcast receiver terminal of the embodiment has a typical broadcast receive function as well as the functions below for enjoying the service to provide program related information related to the program that the user watches or plays back.

(1) A received channel storing function that stores the channel currently being received.
(2) A clock function that holds the current time.
(3) An installation area holding function that sets and stores installation areas of receiver terminals.
(4) A network connection function that connects to the Internet to send and receive data.
(5) An information process function that performs a process to take out related information in accordance with the user's instruction for presentation.

The clock function has 'just clock' that sets time by a time signal broadcast at a fixed time, an NTP client function that synchronizes with an NTP (Network Time Protocol) server through the Internet to set time, or an automatic time set function such as a radio wave clock, for accurate adjustment.

Furthermore, the broadcast receiver terminal of the embodiment has a typical broadcast receive function and a recording function that records a received program as well as a recorded program database which associates a recorded program with the broadcast channel and the recording date and time (recording start date and time, recording end date and time) of that program for storage. The actual form of the database is one in which programs are stored on the HDD 17 and the CPU 11 operates a predetermined program for database management.

When starting recording, broadcast channel information being received and the recording start date and time are written in the recorded program database, and recording end date and time are written when finishing recording. Therefore, when a program is recorded, the broadcast channel and recording date and time (recording start date and time, and recording end date and time) of the recorded program are always stored in the recorded program database. In addition, when the recorded program is deleted, the record (broadcast channel and recording date and time) corresponding to that in the recorded program database is also deleted.

Figure 4:
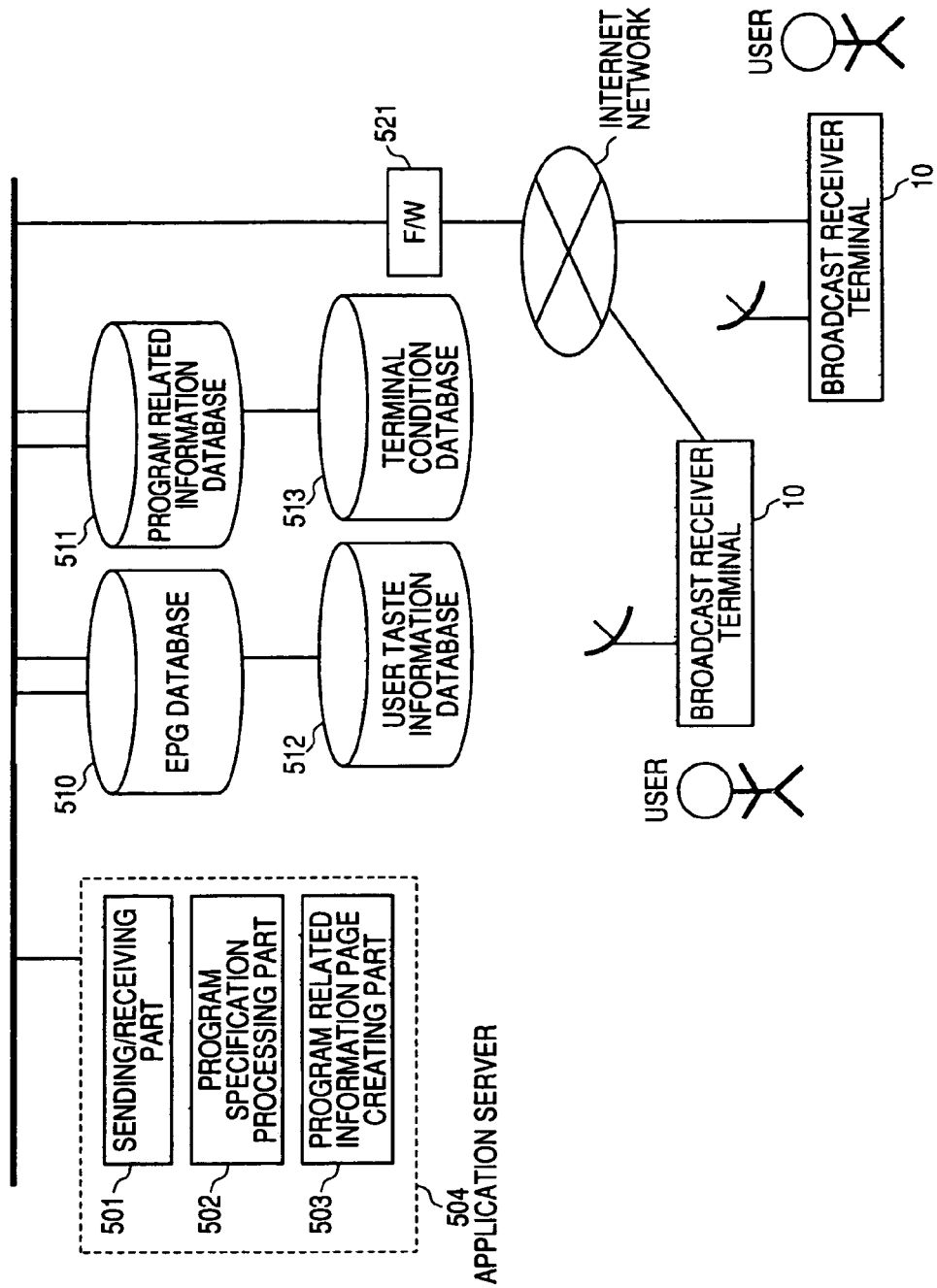
FIG. 4 is a diagram schematically depicting the functional configuration of an information providing server.

FIG. 4 schematically depicts the functional configuration of an information providing server 500 which provides program related information for the user's broadcast receiver terminal 10. The information providing server 500 is installed on the wide area network such as the Internet, which has an upper link to client devices such as a CE device and creates a program related information page about a program that a user is watching and playing back or a given portion of a program, and provides it for the user.

The information providing server 500 shown is connected to the Internet through a fire wall (F/W) 521, which is configured of an application server 504 and multiple databases 510 to 513.

An EPG database 510 covers broadcast program information all over the country, and is always updated to the latest data. In the EPG database 510, a program can be uniquely specified by a data set of a broadcast area, a broadcast channel, and broadcast date and time (start date and time, and end date and time), and holds program information such as the title and cast of each program. Furthermore, the same program is often broadcast by a different broadcast channel in a different area, and different date and time in some cases, but the EPG database is designed so as to hold program identification information in this case. Program specification information is acquired and set artificially. Each of the EPG data entries in the database is sometimes already used by the Internet and broadcast distribution, and the same entries as these can be used.

A program related information database 511 manages program related information associated with each of the program contents distributed from the broadcast station. The program related information database 511 and the EPG database 510 are related to each other through a program uniquely specified. As described above, a program is uniquely specified by the data set of a broadcast area, a broadcast channel, and broadcast date and time (start date and time, and end date and time). Related information is held with respect to each program.

Figure 5:
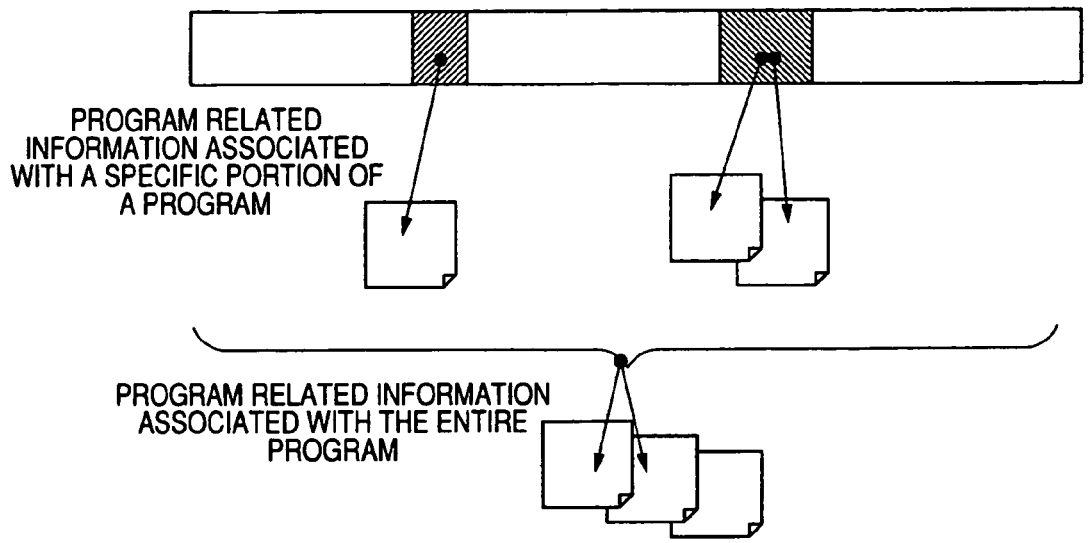
FIG. 5 is a diagram illustrative of the relationship between program contents and program related information.

Program related information has two types, related to an entire program and related to a specific portion of a program (see FIG. 5).

The former program related information related to an entire program is associated with each program uniquely specified on the EPG database and held in the program related information database 511. Multiple items of related information can be associated with a single program.

Moreover, for the latter program related information related to a specific portion of a program, a specific portion in broadcast date and time (start date and time, and end date and time) in each program is specified as an information associated section (start date and time, and end date and time), and the information is associated with this information associated section (start date and time, and end date and time) and held in the program related information database 511. For example, a single program is divided into multiple blocks (information associated sections), information is associated with each block, and then program related information can be provided in more detail. Of course, information can be associated not only with the program main part but also with a broadcast commercial inserted into program contents.

Moreover, the information associated section (start date and time, and end date and time) can be defined and mounted as a specific portion in a single program as well as a specific portion (specified section) over multiple programs, which can be set freely. Also in the same program, a given number of sections can be set even though sections are overlapped. At least a single item of related information can be associated with each of the information associated sections. Furthermore, when program specification information described above has been set, the same related information can be shared by information associated sections in multiple programs identified with the same related information, or in a specified program.

Figure 6:
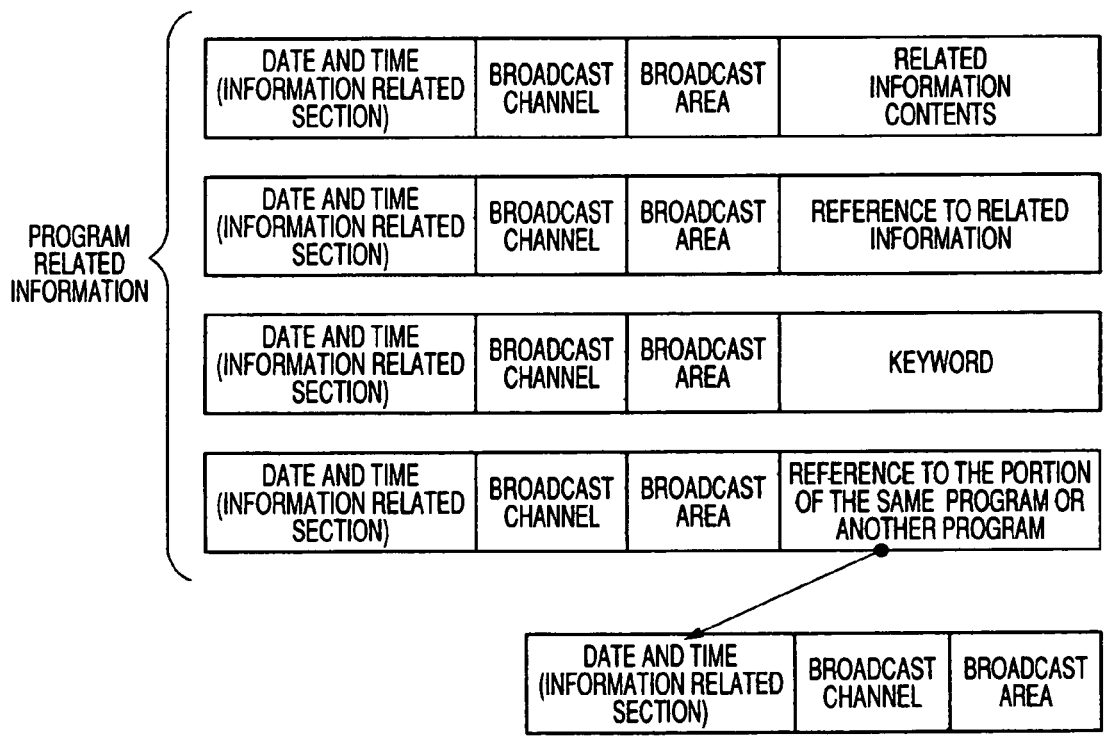
FIG. 6 is a diagram illustrative of the structure of a program related information database.

The program related information database 511 stores an information content main part related to a program as program related information related to each program or a given portion in a program as well as manages as program related information keywords and resource identification information such as URLs and URIs that can be used to search for program related information on a predetermined information space such as WWW on the Internet (see FIG. 6).

Moreover, the program related information database 511 can associate information with another portion in the same program, another program, or a given portion of another program as information related to an entire program or a given portion of a program.

The application server 504 is an entity of the information providing service, which specifies program contents being watched and played back or the portion thereof based on program specification information sent from the broadcast receiver terminal 10, uses the program related information relevant thereto, and sends a program related information page back to a user. As shown in the drawing, the application server 504 has a sending/receiving part 501, a program specification processing part 502, and a program related information page creating part 503.

The sending/receiving part 501 performs a data communication process via the fire wall 521. More specifically, it performs a process that receives program related information from a user and sends back a program related information page.

The program specification processing part 502 performs a process that refers to the EPG database 510 to specify a program or a portion in a program from program specification information received from the user. Since data formed of a combination of broadcast date and time, broadcast channel, and area, for example, is acquired as program specification information from the user, the EPG database 510 is searched based on these keywords to uniquely specify programs.

When the program specification processing part 502 receives program specification information, it compares a data set of installation area information, a broadcast channel, and watching time with a data set of a broadcast area, a broadcast channel, and broadcast date and time (start date and time, and end date and time) in the EPG database 510, and specifies a program being watched in the conditions that matching of both areas and channels, and watching time are included in broadcast date and time (start date and time, and end date and time). Furthermore, it performs a search process whether watching time is included in any one of information associated sections, and consequently specifies related information related to all of that program and related information related to the specific portion of that program.

Here, in relating the program contents or a given portion of the program contents to related information, it is likely that there is the difference in specification information of the same program caused by the difference in the broadcast circumstances in each area. In the embodiment, the program specification processing part 502 has broadcast date and time modification information about broadcast stations and programs in each area to solve a problem of the difference between areas and to implement unique association of related information with the same program specified by program specification information varied in each broadcast area. Moreover, it specifies a given portion of the program contents based on the elapsed time from the beginning of the contents, and implements association with related information.

The program related information page creating part 503 searches the program related information database 511 for information associated with the specified program or the portion in the program, and creates a program related information page to be presented to a user based on the taken program related information.

The program related information database 511 stores the information content main part related to a program as information related to an entire program or a given portion in a program as well as manages as program related information keywords and reference or resource identification information such as URLs and URIs that can be used to search for program related information on a predetermined information space such as WWW on the Internet (see FIG. 6). In the case of the latter, the program related information page creating part 503 uses resource identification information obtained based on program specification information or keywords to perform a search process for related information on the WWW information space, and uses collected information to create a program related information page.

The program related information page creating part 503 creates the page in a Web page format using structure description such as HTML and XML. In this case, on the broadcast receiver terminal 10 side, the program related information page can be browsed. Moreover, a link may be set in the program related information page to present related information on the Internet, or to guide a user to an EC (Electric Commerce) site. Alternatively, an access scheme of program related information to Websites on the Internet may be expressed in a URL format.

Figure 7:
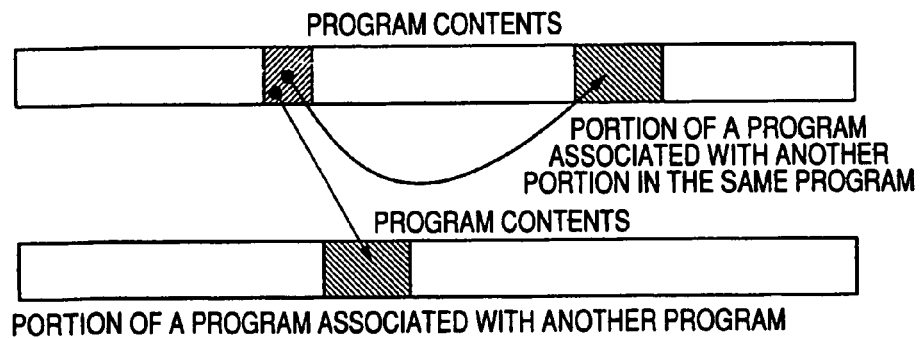
FIG. 7 is a diagram illustrative of the relationship between program contents and program related information.

Furthermore, the program related information database 511 can associate information with another portion in the same program, another program or a given portion in another program as information related to an entire program or a given portion in a program (see FIG. 7). In this case, in response to the user operations with respect to related information about another portion in the same program, another program, or a given portion of another program on the program related information page, playback of that program or program portion is activated.

Provision of the Program Related Information Page

Figure 8:
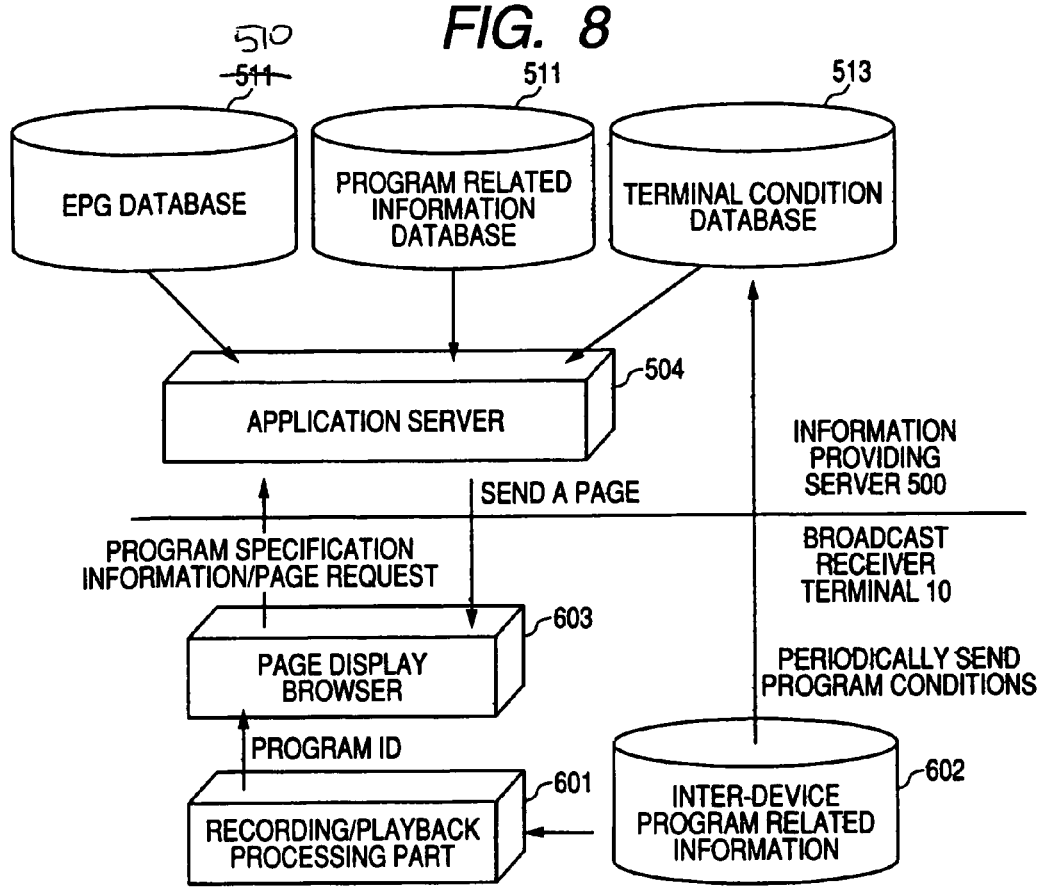
FIG. 8 is a diagram illustrative of mechanisms of services which present program related information related to a program that a user watches or plays back.

The information providing system according to the embodiment performs a service to present program related information related to the program that a user watches or plays back. This is implemented by the cooperative operation of the information providing server 500 and the broadcast receiver terminal 10 on the user side. FIG. 8 schematically depicts the system configuration thereof.

On the information providing server 500 side, the server has the EPG database 510 which stores the contents of broadcast program main parts and content metadata such as an EPG associated therewith, the program related information database 511 which stores program related information associated with a program or the specific portion in a program, each of the terminal condition databases 513 which manage information about conditions of a program that is watched or recorded/preselected for recording on the terminal of each user, and the program related information page creating part 503 which creates a program related information page based on program related information and terminal conditions and provides it to the terminal side. The details of the program related information page will be described later.

On the other hand, on the broadcast receiver terminal 10 side, the terminal has a recording/playback processing part 601 which processes recording, preselected recording and playback of a received broadcast program (including simultaneous playback), a program/content inter-device metadata database 602 which manages received broadcast contents and metadata such as an EPG distributed in association with the broadcast contents in the device, and a page display browser 603 which displays and browses a program related information page provided from the information providing server 500. The functional configuration like this is in fact implemented by running a predetermined program related information search/browse application on the CPU 11.

The recording/playback processing part 601 acquires broadcast time, a broadcast channel, and a broadcast area in response to a predetermined operation such as a user pressing a button on a remote control 66 in watching a broadcast program, and passes them as program specification information to the page display browser 603. Moreover, the program/contents inter-device metadata database 602 sends program information to the information providing server 500 at any time in response to the program condition varied in the terminal 10.

Furthermore, in the case where a user performs a predetermined operation such as a user pressing a button on the remote control 66 when a recorded program is being played back, the recording/playback processing part 601 determines the current playback position of that recorded program being played back as playback time from the beginning thereof. This can be determined from the time code recorded in a data stream of the recorded program. Then, recording date and time (recording start date and time, and recording end date and time) corresponding to the recorded program currently being played back is read out of the recorded program database part (described above), and the value that the playback position data is added with that recording start date and time as an offset is set to the broadcast time of the current playback position of that recorded program. Moreover, a broadcast channel of that recorded program is acquired from the recorded program database, and installation area information is acquired from an installation area holding part. Then, program specification information formed of the broadcast time, the broadcast channel, and the broadcast area is passed to the page display browser 603.

The page display browser 603 sends a request for a program related information page to the information providing server 500 together with program specification information.

On the information providing server 500 side, the server compares a data set of the received installation area information, the broadcast channel, and watching time with a data set of the broadcast area, the broadcast channel, and the broadcast date and time (start date and time, and end date and time) in the EPG database 510, and specifies a program being watched in the condition that matching of both areas and channels and watching time are included in the broadcast date and time (start date and time, and end date and time). Furthermore, it performs a search process whether watching time is included in any one of information associated sections, and consequently specifies related information related to that entire program and program related information related to the specific portion of that program. Then, it creates a program related information page based on the obtained information, and sends it back to the broadcast receiver terminal 10.

Subsequently, the page display browser 603 displays the program related information page for browsing by the user. A link can be set in the program related information page to present related information on the Internet, or to guide a user to an EC (Electric Commerce) site. Alternatively, an access scheme of program related information to a website on the Internet can be expressed in the URL format.

Figure 9:
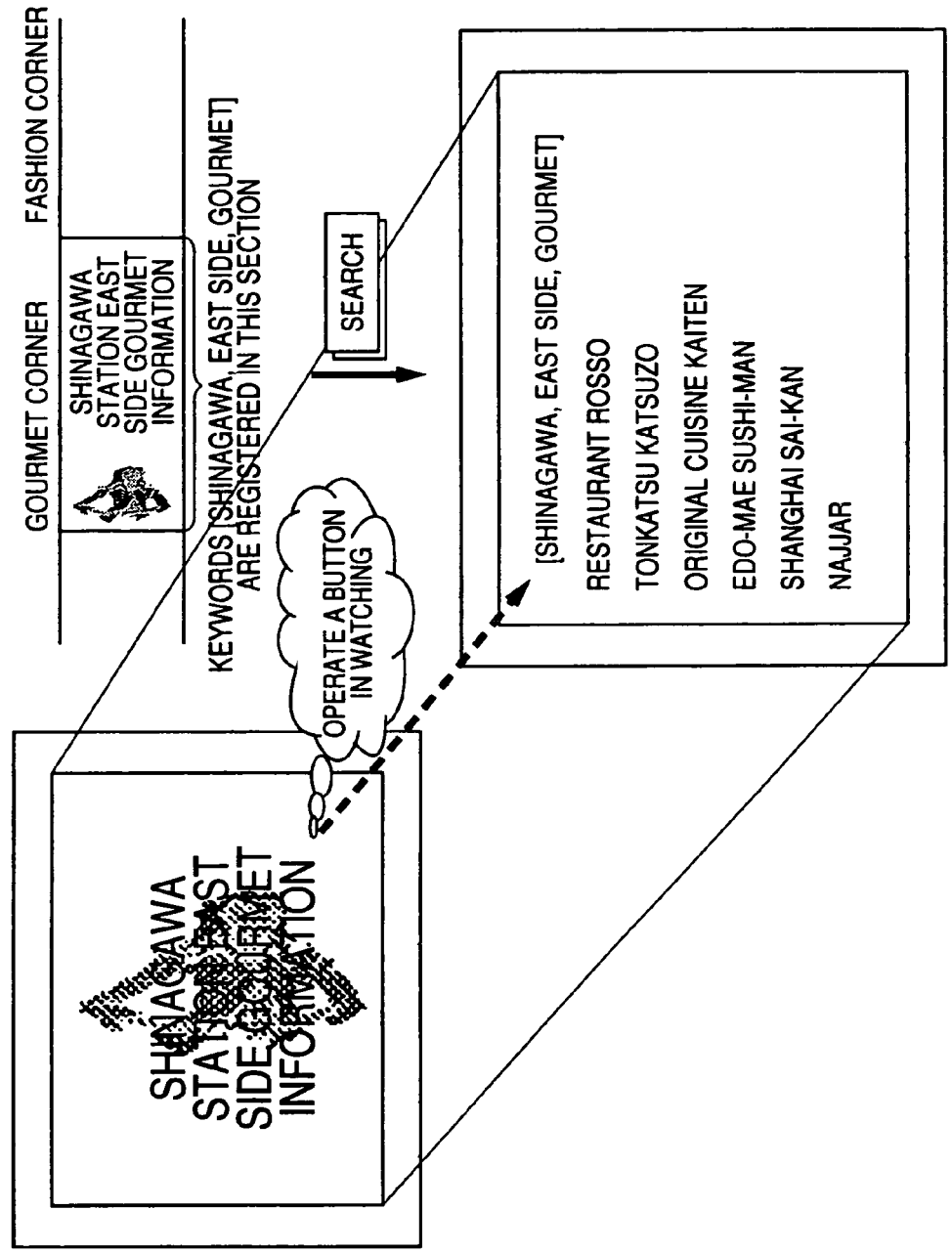
FIG. 9 is a diagram illustrative of mechanisms of creating a program related information page in response to a page request from a user in watching or playback.

FIG. 9 illustrates mechanisms of creating a program related information page in response to a page request from a user in watching program contents or playing back recorded contents.

In the example in the drawing, a user is operating a page request button on the remote control 66 in the section of Gourmet Corner in watching or playing back the program contents formed of multiple sections such as 'Gourmet Corner', and 'Fashion Corner'. In this case, program specification information formed of the broadcast date and time, the broadcast channel, and the broadcast area is sent from the broadcast receiver terminal 10 to the information providing server 500.

On the information providing server 500 side, a program is specified based on program specification information, and it is acquired that keywords of 'Shinagawa, east side, gourmet' are registered as program related information in that section of the program where the request has been made.

Then, the WWW information search space on the Internet is searched under the search condition using these keywords, and the obtained information is used to create a program related information page. In the example shown in FIG. 9, links to other items of related information such as 'Restaurant Rosso', 'Tonkatsu Katsuzo', 'Original Cuisine Kaiten', 'Edo-mae Shushi-Man', 'Shanghai Saikan', and 'Najjar' are set in a menu button format in the program related information page. Related information on the Internet can be presented, and the user can be guided to an EC (Electronic Commerce) site.

Figure 10:
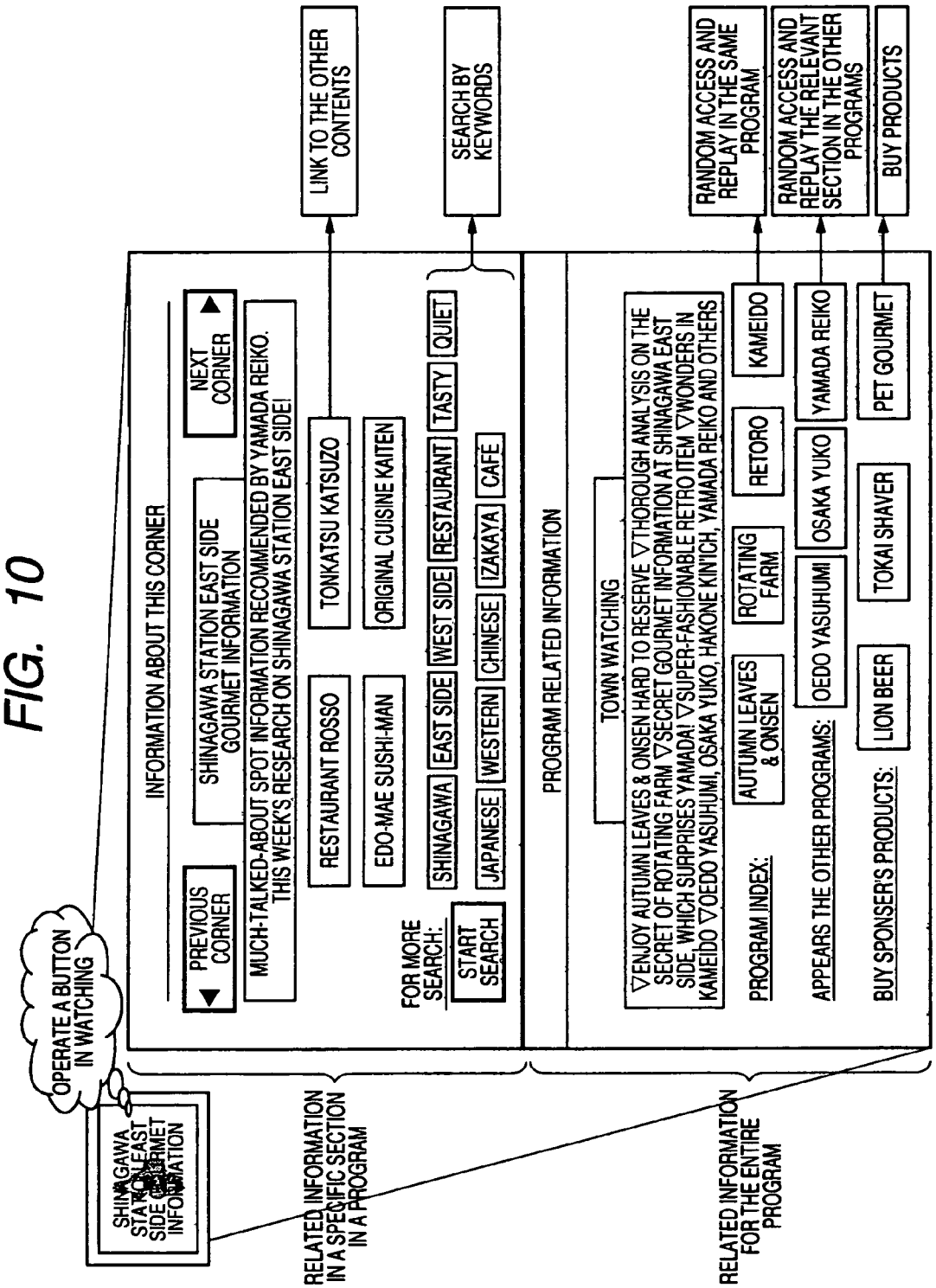
FIG. 10 is a diagram depicting an exemplary configuration of a program related information page provided from an information providing server to the broadcast receiver terminal.

FIG. 10 depicts another exemplary configuration of a program related information page provided from the information providing server 500 to the broadcast receiver terminal 10. In the program related information page shown in the same drawing, related information associated with all of that program and related information associated with a specific section (in the example in the drawing, 'gourmet corner') where the request has been made are displayed in parallel.

More specifically, in the upper-half frame on a program related information page screen is a screen frame on related information associated with the specific section (in the example in the drawing, 'Gourmet Corner') where the request has been made, and link buttons to other items of related information such as 'Restaurant Rosso', 'Tonkatsu Katsuzo', and 'Original Cuisine Kaiten' are displayed.

Furthermore, on the same screen frame, buttons are prepared which request related information in the latest sections ('Previous Corner' and 'Next Corner') before and after on the time basis. When these buttons are operated, the relevant program specification information is sent to the information providing server 500. Subsequently, on the information providing server 500 side, program related information in the relevant section is taken out as a keyword, for example, and an information search is conducted to provide the same program information screen.

Moreover, in the same screen frame, buttons for related keywords are provided so that the user freely does a keyword search based on the result displayed on the screen, independent from the information providing server 500 after this. When the user operates a desired keyword, an information search process including that keyword in the search condition is activated to display and output the search result (not shown).

Furthermore, in the lower-half of the program related information page screen, program related information associated with that entire program is shown. In the example shown in FIG. 10, all of a program having the title of 'Town Watching' is associated, and the program title, the detail of that program, and the cast of the program are displayed.

When another portion in the same program, another program, or another portion of another program is associated as information related to an entire program or a given portion of a program, a button which activates replay of this related program or program portion is prepared on the program related information page. In the screen frame shown in the drawing, buttons are prepared which do random access and replay in this related program, and which do random access and replay in the relevant section of another program in which the cast of this related program appears.

Furthermore, in the screen frame shown in the drawing, a merchandise button by which a user buys a product of a program sponsor is prepared, and the user can be guided to an EC (Electronic Commerce) site.

Provision of the Base Program Related Information Page

In the information providing system according to the embodiment, a concept of 'base program' is introduced in providing program related information. More specifically, a predetermined program is set to a base point to sequentially present program related information, and thus information related to a program being watched is given to smoothly guide the user to the next preselected recording operation without deadening the user's interest inspired by watching a program.

In the embodiment described in Section B, a presentation process for program related information is activated in response to the user operation with respect to the remote control 66. At this time, a recorded program being played back, or a broadcast program being watched is set to a base point, and program related information that treats this 'base program' is created. Hereinafter, this is called 'base program related information'.

The service which provides program related information about the base program is also implemented by the mechanisms shown in FIG. 8.

On the information providing server 500 side, the server has the EPG database 510 which stores the contents of broadcast program main parts and the EPG associated therewith, the program related information database 511 which stores information associated with the program contents or the specific portion thereof, each of the terminal condition databases 513 which manage information about conditions of a program that is watched or recorded/preselected for recording on the terminal of each user, and an application server 504 which creates a program related information page based on program contents, metadata and the terminal condition, and provides it to the terminal side. The details of the program related information page will be described later.

On the other hand, on the broadcast receiver terminal 10 side, the terminal has the recording/playback processing part 601 which processes recording, preselected recording and playback of a received broadcast program, the program/content inter-device metadata database 602 which manages received broadcast contents and metadata such as EPG distributed in association with the broadcast contents in the device, and the page display browser 603 which displays and browses a program related information page provided from the information providing server 500. The functional configuration like this is in fact implemented by running a predetermined program related information search/browse application on the CPU 11.

The recording/playback processing part 601 passes program specification information to the page display browser 603 in response to a predetermined operation such as a user pressing the button on the remote control 66 in playing back a recorded program or in watching a broadcast program. Moreover, the program/contents inter-device metadata database 602 sends program information to the information providing server 500 at any time in response to the program condition varied in the broadcast receiver terminal 10.

The page display browser 603 requests the information providing server 500 for a program related information page. This request includes program specification information. On the information providing server 500 side, a program related information page is created based on program/contents metadata and the terminal condition, and sent back to the terminal 10. Then, the page display browser 603 displays the program related information page for browsing by the user.

Here, the program related information database 511 on the information providing server 500 side divides information about each of broadcast programs into multiple items including program attributes such as 'next broadcast schedule', 'cast', 'title', and 'genre', and the other program association schemes for management. Moreover, each item is assigned to the relevance ratio with respect to a program. For example, the next broadcast schedule has the highest relevance ratio with respect to the program, the program has a decreasing relevance ratio in order of cast, title, and genre, and so on. Then, a database search is done for programs related to the base program at each item. The base program related information page is configured of arranging related programs hit in order of items having a decreasing relevance ratio with respect to the base program based on the search result for the database, and displayed and outputted as a browser screen.

In Table 1 below, association schemes with the base program are summarized.

| Information for association with base program | Title of related program | Details of search conditions |
| --- | --- | --- |
| Program (/product) attribute data | Next scheduled broadcast | A match of data and time or days in a week of broadcast hours with a title and a broadcast station. The search area is the nearest, the same hour tomorrow, or the same hour the next week. |
| | Cast related program | A match of names in cast, or a match of names extracted from program contents |
| | Genre related program | A match of genre names in genre |
| | Similar program | A program having many matches among programs is considered to have a high degree of similarity, which is shown in higher priority. |
| Defined by administrator | Campaign | Associated by a system administrator |

For the association schemes with the base program, the definitions by program (product) attributes and administrators can be exemplified.

The program (product) attributes are subdivided into items such as 'next broadcast schedule', 'cast related program', 'genre related program', and analog program. 'Next', that is, the next broadcast schedule program can be searched based on date and time (or day in a week), titles, broadcast stations, the latest, the same hour tomorrow, and the same hour the next week. For the other programs 'related to cast', names are extracted from the cast and the detail of programs, and can be searched based thereon. 'Genre related program' can be searched based on genre information. Analog program can be searched based on the similarity between program attributes.

In the association scheme with the base program based on the definition of administrators, a system administrator himself or herself performs association with the base program for intention of 'campaign'.

Figure 11:
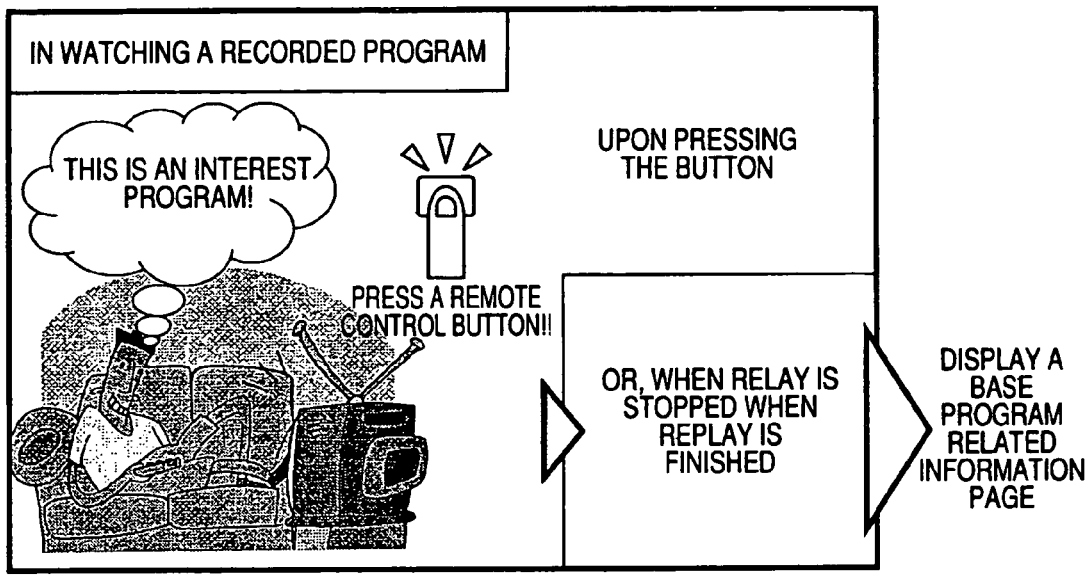
FIG. 11 is a diagram depicting a manner in which a user watching program contents with the broadcast receiver terminal inputs a base program by operating a remote control.
Figure 12:
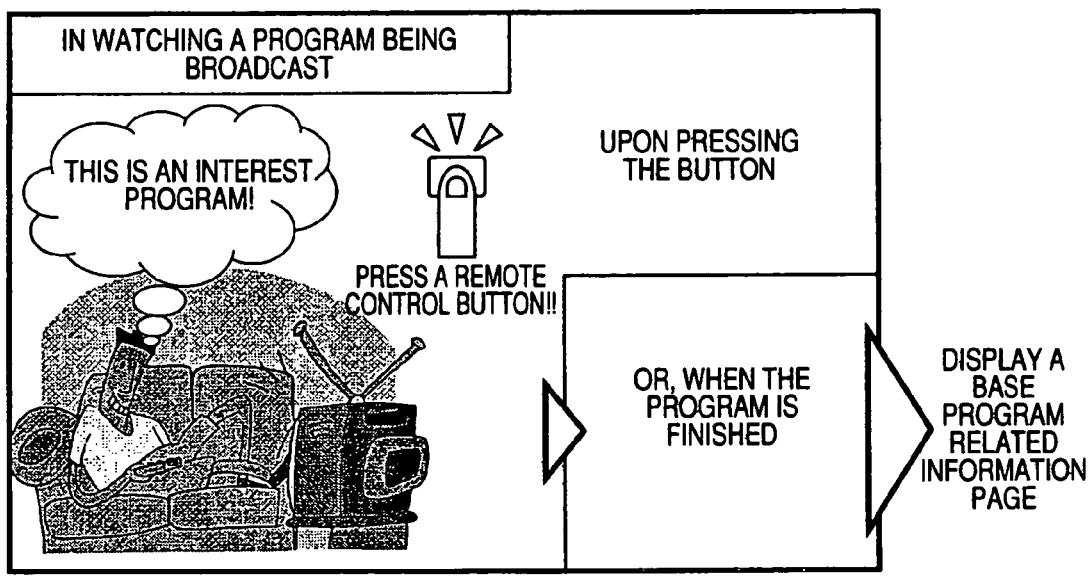
FIG. 12 is a diagram depicting a manner in which a user watching program contents with the broadcast receiver terminal inputs a base program by operating a remote control.

FIGS. 11 to 13 depict a manner that a user watching the program contents with the broadcast receiver terminal 10 operates the remote control 66 and inputs a base program. As shown in FIGS. 11 and 12, while the user is watching the recorded program, or watching the program contents being broadcast, the user operates the page request button of the remote control 66 in the scene that inspires interest, and thus the user can activate a sending process of a program related information page request for the information providing server 500. This request is sent immediately together with the button operation, or sent at a breakpoint such as playback stop, playback end, and program end. Furthermore, as shown in FIG. 13, when the user finds an interesting program while browsing a program list provided by the EPG, the user operates the page request button of the remote control 66, and thus the user can activate the sending process of the program related information page request with respect to the information providing server 500.

Figure 15:
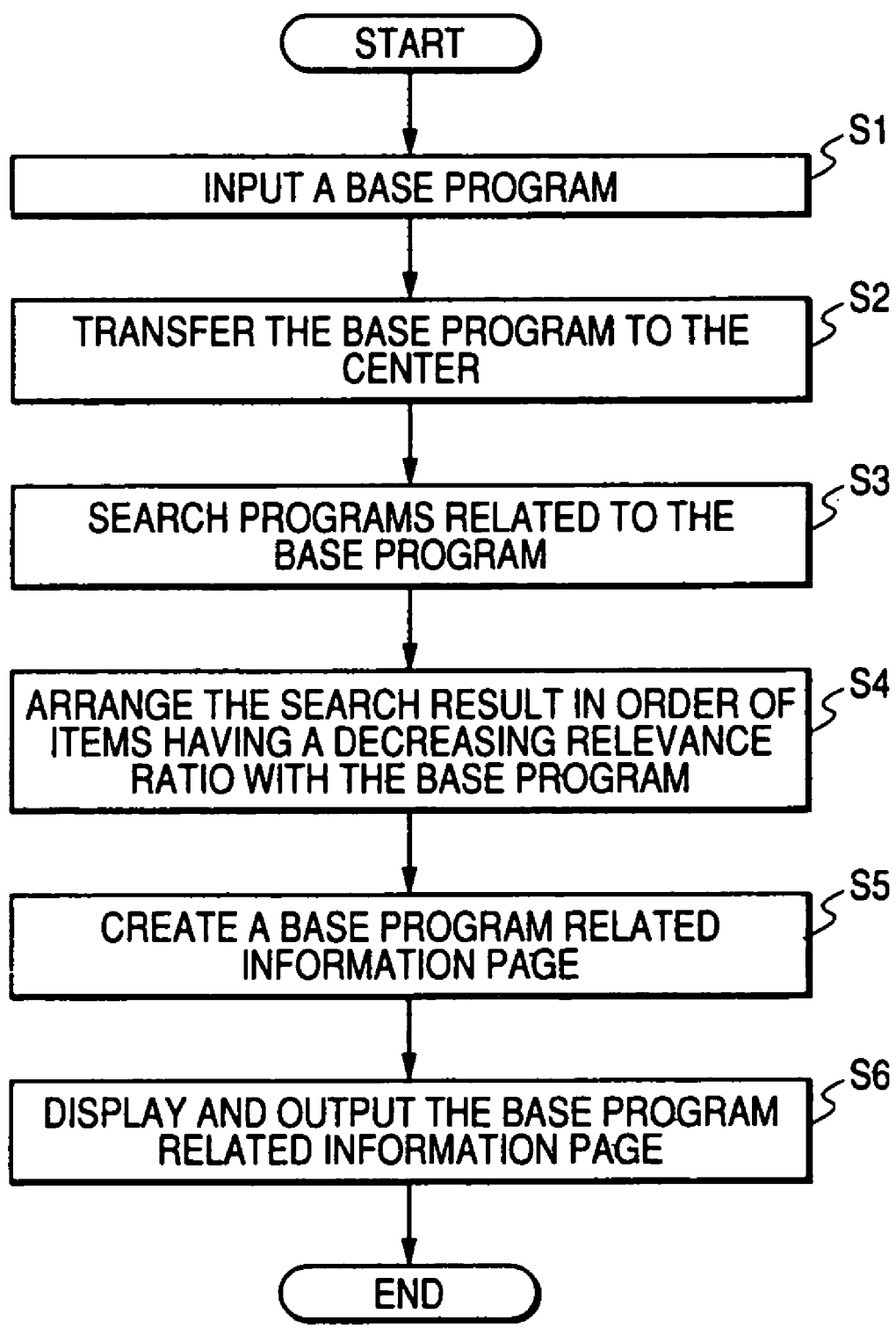
FIG. 15 is a flow chart depicting process procedures for providing the base program related information page.

FIG. 14 depicts the configuration of the base program related information page. In addition, FIG. 15 depicts the process procedures of providing the base program related information page.

First, the base program is inputted (Step S1). When a predetermined button of the remote control 66 is pressed in watching a recorded program, the program being played back is set to a base program. Alternatively, when the playback of a recorded program is stopped, or when playback is finished, that program is also set as the base program (see FIG. 11).

Furthermore, when a predetermined button of the remote control 66 is pressed in watching the program being broadcast, or when a program is finished, that program is set as the base program (see FIG. 12).

Moreover, when, when a predetermined program column is operated by the remote control 66 while the EPG is being activated and a program list is being browsed, the relevant program is set as the base program (see FIG. 13).

When the base program is set, program specification information thereof is transferred from the broadcast receiver terminal 10 to the information providing server 500 (Step S2). The program specification information is formed of the broadcast date and time at the point in time of broadcast when the button is pressed, the broadcast station name and broadcast area or a broadcast station ID.

On the information providing server 500 side, the EPG database 510 may be searched to identify the base program.

The information providing server 500 searches the program related information database 501 in accordance with a predetermined search rule (see Table 2), and creates a base program related information page based on the search result.

In the program related information database 501, information about each broadcast program is subdivided into multiple items of program attributes and the other program association schemes for management. Moreover, each item is assigned to the relevance ratio with respect to programs. First, a database search is done for each item of programs related to the base program (Step S3). Then, the search result of the program related information database 501 is arranged in order of items having a decreasing relevance ratio with respect to the base program (Step S4), and a base program related information page is created (Step S5).

The created base program related information page is sent back to the broadcast receiver terminal 10 of an original request source. Subsequently, on the broadcast receiver terminal 10 side, the browser is activated to display and output the base program associated page (Step S6). On the page screen, program information related to the base program is displayed to accept preselected recording thereof and the other user operations.

On the base program related information page, a recommended program based on the base program is displayed. In the example shown in FIG. 14, a list of recommended programs is displayed in order of items having a decreasing relevance ratio, such as 'next broadcast schedule', 'cast', 'title', and 'genre'. In addition to this, a guide to community sites and links to the other applications handling the base program are also shown in the base program related information page.

In the next broadcast schedule column, the next broadcast schedule of the base program is presented together with date and time and program titles.

Moreover, in the related program column, the related program column is arranged so that items having a higher relevance ratio with respect to the program are at the top, such as cast, title, genre, and so on. The screen is scrolled to move to the related program column of the lower items for which the relevance ratio is set lower (not shown). The items are presented in order of a decreasing relevance ratio with respect to the base program to allow enhanced convenience of selecting in browsing by the user.

In the cast related program column, the other programs in which the (main) cast of the base program appears are presented together with the broadcast date and time and the program title. In the title related program column, the other programs related to the title of the base program are presented together with the broadcast date and time and the program title. In the program list of the related program columns, a recording preselected icon or a recorded icon may be indicated for programs already preselected for recording or recorded, and prevent overlapped preselected recording operations. Furthermore, when the same program is made entry between cast or items at the same time, program information may be deleted from one column to display much more items of program information.

When the number of programs/contents is great in the related program column, the programs/contents may be filtered in order of a decreasing matching rate with the user's taste, in order of broadcast date and time close to or far from the base program, in order of display date and time close to or far from the base program associated page, and in order of rating by rating information or vote by multiple users. Moreover, when the same program is searched and displayed for multiple times with respect to multiple actors/actresses in a series of programs, only the top programs may be displayed on the page to display as many related programs as possible in the limited screen size. Furthermore, in relation to a lower actor/actress on the page or another relation, when the number of the relevant programs searched is few, the overlapped programs may be displayed with respect to that actor/actress for a fixed number of programs.

On the base program related information page, the column to present program information can be provided in various aspects of campaigns and recommendations, in addition to program information related to the base program.

FIG. 16 depicts another exemplary configuration of the base program related information page. In the example shown in the drawing, program information is presented in aspects of anticipation for the next boom, and program preselected information by people who preselect the same program. In this program column, a recommended program by an editor, a recommendation in liaison between programs, a recommendation customized based on history, and a recommendation by statistically processing the history of all the users are presented to allow provision of various services. Furthermore, in addition to the program column, the page can be expanded freely, such as with links to guide the user to products and the other applications handling the base program.

When the number of the relevant programs is few in relation to the program set as the base program, the page may be configured in which the number of related contents set by an administrator is increased, otherwise decreased to always display a fixed volume of information.

In addition, the types of relations and orders in the base program associated page may be switched in accordance with attributes such as the genre of the base program. Moreover, the types of relations and orders in the base program associated page may be customized based on user taste information of a request source.

In the related program shown on the base program related information page, an operation scheme applied to that program is embedded. For example, an entry of the recommended program list such as 'next broadcast schedule' is selected, and then the summary of that program and dialog including operation schemes for programs such as 'recording at this time', 'recording at every time', and 'daily recording', that is, detail operation screen appears.

Figure 17:
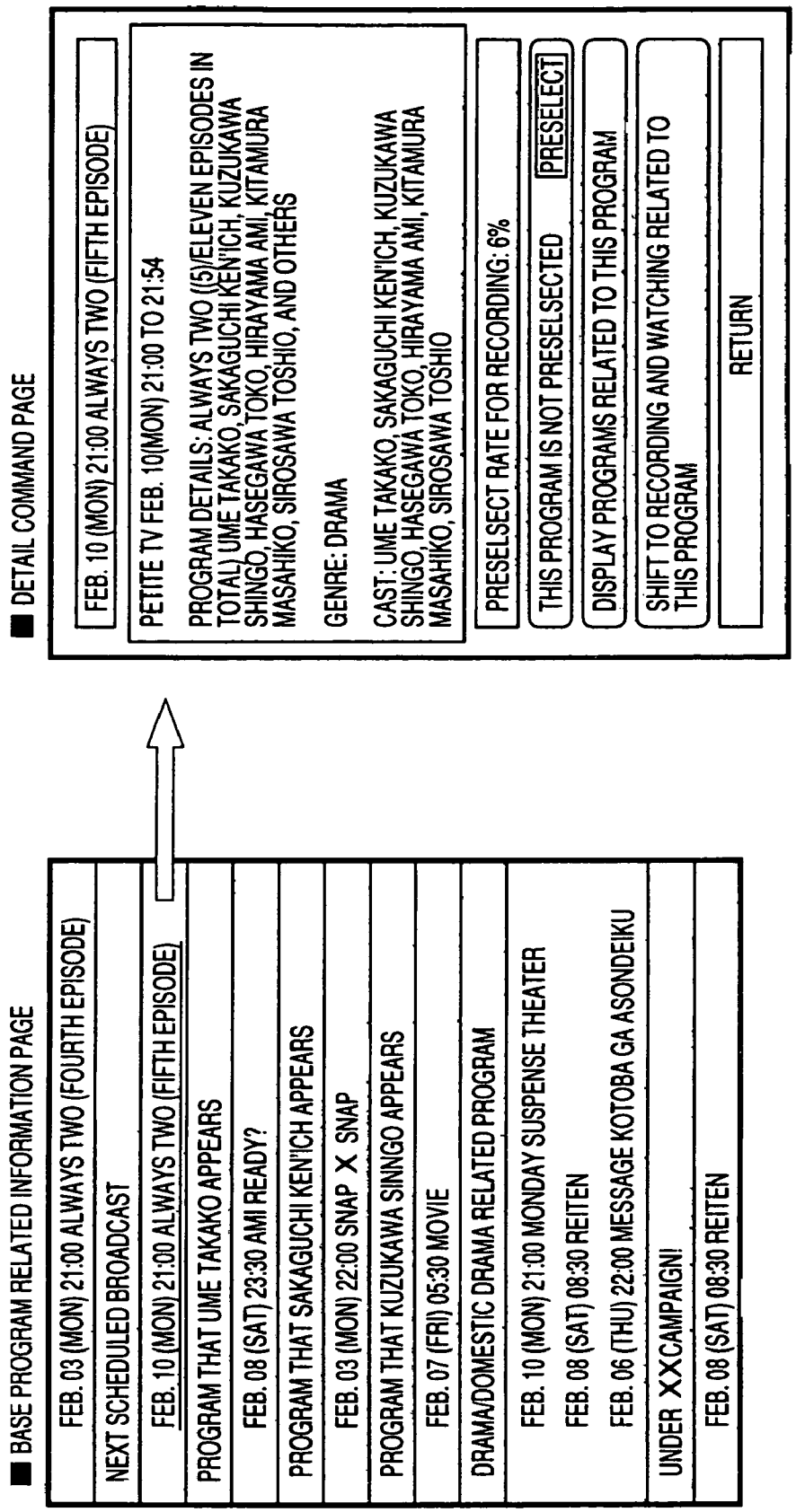
FIG. 17 is a diagram depicting an exemplary configuration of a detail operation screen shown on the base program related information page depicted in FIG. 14 by selecting 'Always Two (fifth Episode)', which is on the next broadcast schedule.

FIG. 17 depicts an exemplary configuration of a detail operation screen displayed by selecting 'Always Two (fifth episode)' being the next broadcast schedule on the base program related information page shown in FIG. 14. The preselected recording operation can be done directly through the dialog shown in the drawing, that is, the detail preselection screen. Moreover, not shown in the drawing, a recording preselected icon or a recorded icon may be indicated for the programs already preselected for recording or recorded in the recommended program list on the base program related information page to prevent overlapped preselected recording operations.

Furthermore, program related items such as cast and titles are selected on the base program related information page, and thus they can be registered as keywords. In the system according to the embodiment, programs including items registered as keywords in program information can be automatically recorded. FIG. 18 depicts a manner when an actor registered as a keyword is selected. This operation registers the name of the actor as a keyword, and a dialog to set whether to automatically record the program including that keyword is popped up for display.

On the base program related information page, the column to present program information can be provided in various aspects such as campaigns and recommendations in addition to program information related to the base program (described above). For example, special contents may be presented when a predetermined condition is matched on the base program related information page.

For special conditions here, the cases below can be named.
(1) The case where all the programs presented on the base program associated page are in the same broadcast station (for example, all the programs are programs in A station).
(2) The case where the result that broadcast hours of the program presented on the base program associated page is added is the same value as a special value (for example, the added result is 777 minutes).
(3) The case where the number of accesses reaches a predetermined number of times in total (for example, it reaches just ten thousand times) (for example, the number of uses in this page is 10,000 times).
(4) The case where the sum of recording times reaches a set count.

Moreover, when such a special condition is matched, for example, the information below may be provided on the base program associated page.
(1) Program information exceeding the period for providing the EPG.
(2) Campaign program.
(3) Digital data broadcast.
(4) Link to the other media contents.

FIG. 19 depicts an exemplary configuration of a base program related information page on which information about a campaign program is displayed as special contents. Furthermore, FIG. 20 depicts an example that presents programs matched at the maximum with an interactive program and with personal taste as campaign programs. For example, as the interactive program, a program that desires to join audiences widely may be presented in priority such as a broadcast incorporating telephone, facsimile, ground and digital waves.

Shift of the Base Program

In the examples shown in FIGS. 11 to 15, the recorded program being played back or the broadcast program being watched is set as a base program that most attracts user's interest at that point in time, and the base program related information page is created based on the relevance ratio with respect to the base program. Therefore, the base program related information page presented for the user is varied depending on which program is set as the base point.

Furthermore, as described above, the user can apply processes such as preselected recording, and playback (where it is the program already preselected) to the related program presented on the base program related information page. Although the base program can be positioned as a program that most attracts the user's interest, it can be considered that the user's interest is shifted at a point in time when the user instructs preselected recording and playback of the other programs on the base program related information page. Thus, it is relevant to shift the base program. Moreover, the user sometimes desires to shift the base program intentionally. Hereinafter, the procedures of shifting the base program will be described.

In playing back a certain recorded program, or in response to operating a predetermined button on the remote control 66 in watching a broadcast program, a base program related information page is displayed. In the base program related information page, program information related to the base program is listed. When any one of the related programs is selected, a detail operation screen (see FIG. 17) appears that instructs application of the preselected recording and playback processes to the related program. FIG. 21 depicts exemplary procedures of shifting the base program through operations on the detail screen.

When the next broadcast schedule program, for example, is selected on the base program related information page, a detail preselection screen about that program is popped up for display (see FIG. 17). Here, the base program is not shifted when continuing of the preselection operation is canceled, whereas when the next broadcast schedule program is preselected, the base program is shifted to the preselected program. In this case, a database search is again done for the base program and the related programs for each item as the next broadcast schedule program is the base point. The database search result is arranged in order of items having a decreasing relevance ratio with respect to the base program, and displayed and outputted.

Moreover, when a related program (for example, that drama/domestic drama related program) other than the next broadcast schedule is selected on the base program related information page, a detail preselection screen about that program is popped up for display. Here, the base program is not shifted when continuing of the preselection operation is canceled, whereas when the next broadcast schedule program is preselected, the base program is shifted to the preselected program. When the base program is shifted in this manner, a database search is again done for the base program and the related programs for each item as the next broadcast schedule program is the base point. The database search result is arranged in order of items having a decreasing relevance ratio with respect to the base program, and displayed and outputted.

According to the base point shifting scheme shown in FIG. 21, the program that has been preselected for recording is the base program, and the base program related information page is sequentially displayed. More specifically, since programs to move forward preselected recording are varied in a roaming search mode, the range of preselected recording is increased.

Figure 22:
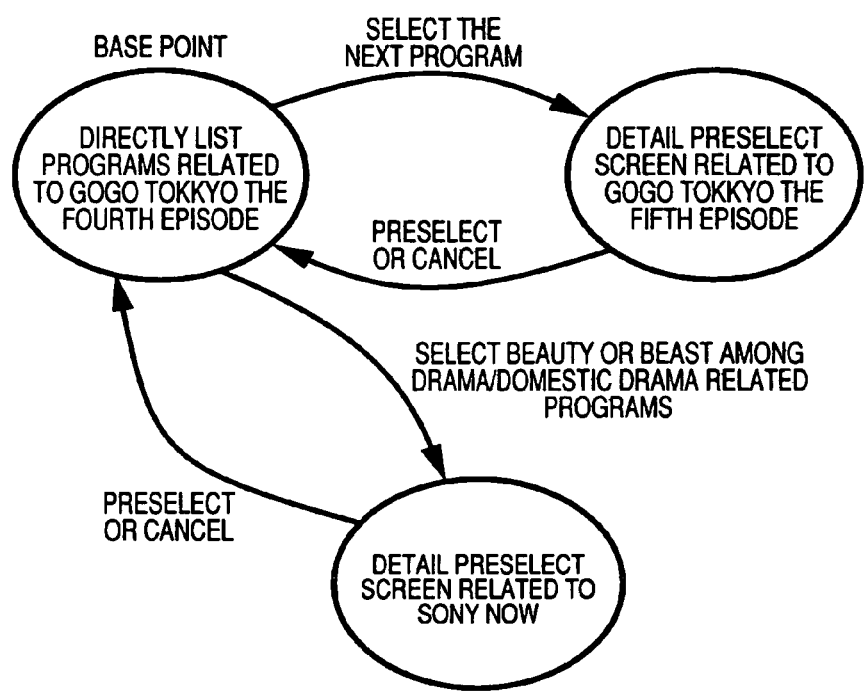
FIG. 22 is a diagram depicting procedures of control operation of a base program according to a fixed base point mode.

In addition, inverse to the 'roaming search mode' that the base program is sequentially shifted as shown in FIG. 21, the base program related information page can be controlled in a 'fixed base point mode' in which the base program is not shifted. FIG. 22 depicts the procedures of control operation of the base program in the fixed base point mode. In this case, even though the preselection operation is done on the detail preselection screen, the base point always returns to the same program. According to the fixed base point mode, a recommended program is not changed by the preselection operation, and thus a user easily responds when there are multiple programs desired for preselection in the recommended programs.

Figure 23:
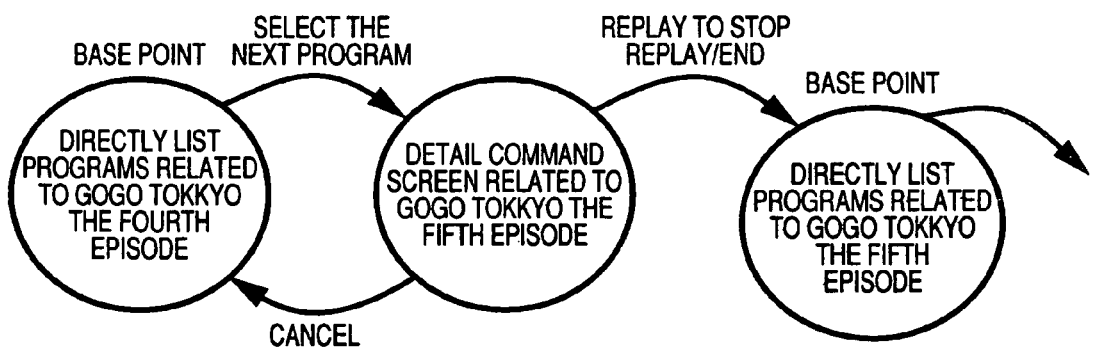
FIG. 23 is a diagram depicting exemplary procedures of automatically shifting a base program in response to instructing playback of a recommended program on the base program related information page (where the program is already recorded).

Furthermore, FIG. 23 depicts exemplary procedures of automatically shifting the base program in response to instructing the playback of a recommended program on the base program related information page (where the program is already recorded). When the related program (for example, next program) having been recorded is selected on the base program related information page, a detail playback screen about that program is popped up for display. Here, the base program is not shifted when the playback operation is canceled, whereas when the playback operation is started, the base program is shifted to that recorded program. When the base program is shifted in this manner, database search is again done for the base program and the related programs for each item as the playback program is the base point. The database search result is arranged in order of items having a decreasing relevance ratio with respect to the base program, and displayed and outputted.

As different from the base point fixed mode, when the shift of the base program is accepted as shown in FIGS. 21 and 23, the detail of the old base program related information page is lost each time. However, depending on the users, a user sometimes desires to again browse the previous base program related information page, or desires to have the remaining related programs shown in detail in the previous base program related information page.

Figure 24:
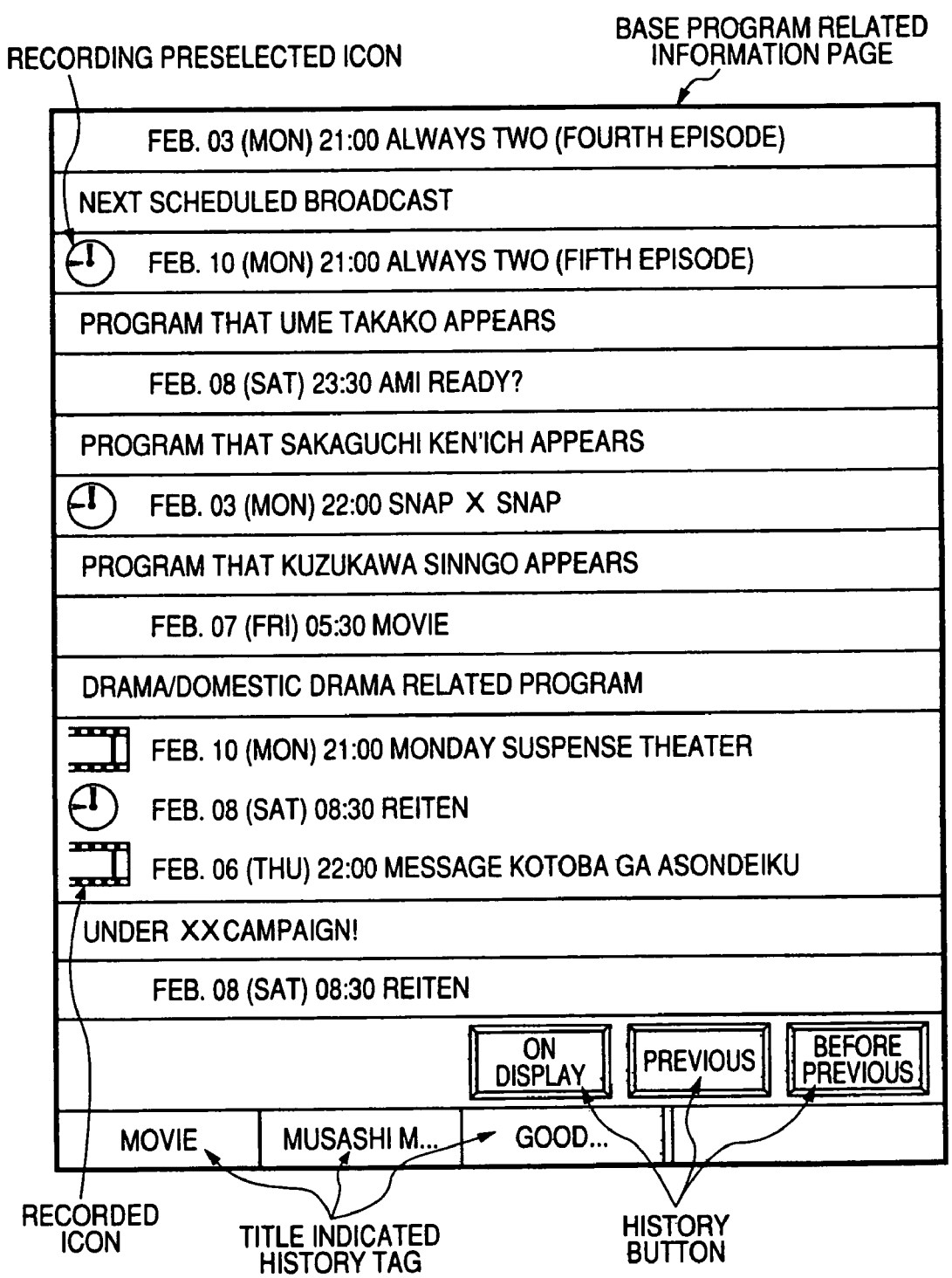
FIG. 24 is a diagram depicting a manner of arranging buttons that instruct reload of base program related information on the base program related information page.

To this end, the display history of the base program related information page is stored. Furthermore, as shown in FIG. 24, history buttons may be prepared on the base program related information page which instruct the reload of base program related information under display, displayed at previous time, and displayed at time after previous time. Also, tags that partially display program titles may be prepared and arranged in order of the display history.

Preselected Recording Function

The base program related information page is configured to arrange the hit related programs in order of items having a decreasing relevance ratio with respect to the base program based on the database search result, which is displayed and outputted as a browser screen. The program attributes are subdivided into items such as 'next broadcast schedule', 'cast related program', 'genre related program', and 'analog program'.

In the base program related information page, information related to the program being watched is given to smoothly lead to the next preselected recording operation without deadening the interest and curiosity inspired by watching the program. However, in the exemplary configuration of the detail operation screen shown in FIG. 17, it is necessary to select an entry in the specific program list from the list of the related programs of the base program, and to set it for preselected recording program by program.

Then, for the preselected recording scheme, schemes may be prepared: the scheme in which all the related programs arranged on the base program related information page are collectively set for preselected recording; and the scheme in which programs selected by a user from among the related programs arranged on the base program related information page are collectively preselected for recording.

FIG. 25 depicts an exemplary screen configuration of collectively setting all the related programs arranged on the base program related information page for preselected recording. In the example shown in the drawing, on the base program related information page, a list of broadcast scheduled programs is shown. However, for simplifying the drawing, the programs are not categorized for each of program attributes. A 'preselect all' button is arranged on the upper right of the page screen, and a user selects and operates this button to activate a preselected recording setting process for all the related programs on the base program related information page.

Moreover, FIG. 26 depicts an exemplary screen configuration of setting for preselected recording only programs selected by a user among the related programs arranged on the base program related information page. In the example shown in the drawing, a list of broadcast scheduled programs is shown on the base program related information page. However, for simplifying the drawing, the programs are not categorized for each of program attributes. A 'preselect all' button and a 'preselect the selected program' button are arranged on the upper right of the page screen. Furthermore, a check box is arranged which specifies whether preselected recording is done for each related program entry. A user selects and operates the 'preselect all' link button to activate the preselected recording setting process for all the related programs on the base program related information page (as above). On the other hand, the 'preselect the selected program' button is selected to activate the preselected recording setting process for the programs specified by the check box.

Next, the procedures of the preselected recording setting process will be described. The preselected recording setting process through the base program related information page is implemented by the cooperative operation between the information providing server and a client (the broadcast receiver terminal).

Figure 27:
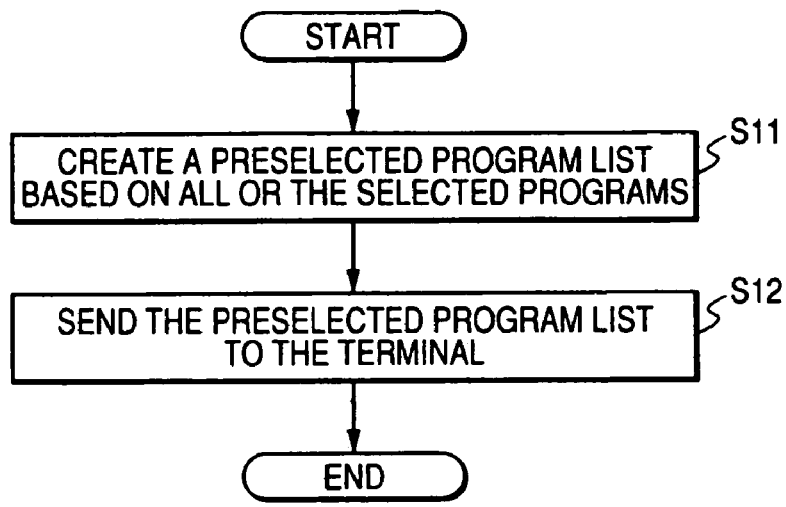
FIG. 27 is a flow chart depicting operation procedures on the information providing server side for performing a preselected recording setting process with respect to a broadcast receiver terminal.

FIG. 27 depicts the operation procedures on the information providing server side of conducting the preselected recording setting process with respect to the broadcast receiver terminal formed of the CE device in the form of a flow chart.

On the server side, a preselected program list is created based on all the programs or the programs selected by a user (Step S11), and the list is sent to the CE device side (Step S12).

Figure 28:
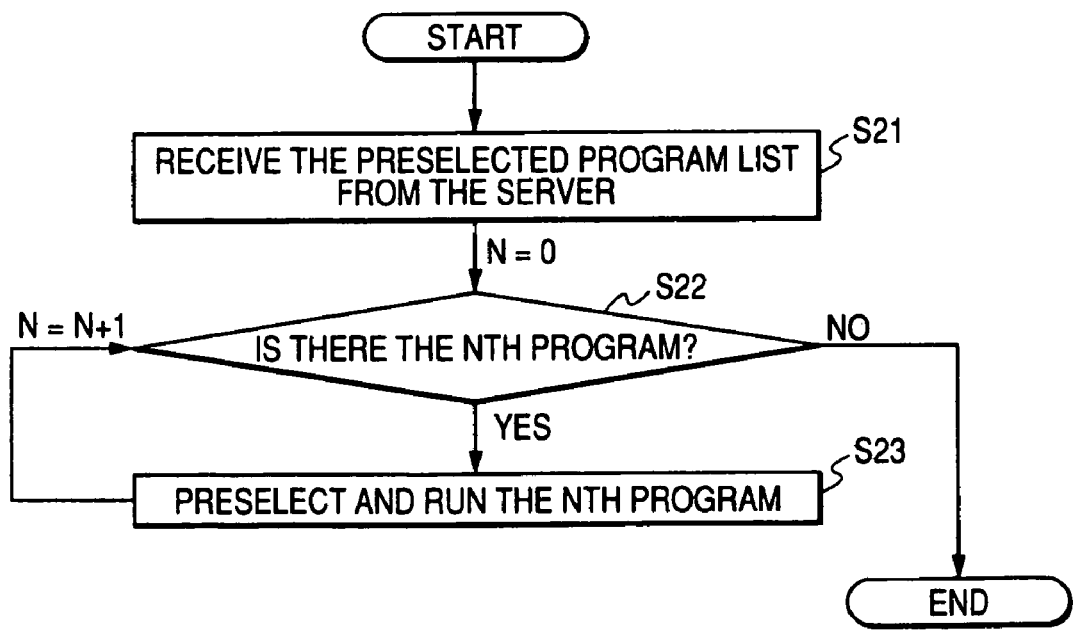
FIG. 28 is a flow chart depicting operation procedures for performing a preselected recording setting process on a broadcast receiver terminal.

Moreover, FIG. 28 depicts the operation procedures of conducting the preselected recording setting process on the broadcast receiver terminal formed of the CE device in the form of a flow chart.

On the CE device side, when the preselected program list sent from the server is received (Step S21), the programs listed in that list are sequentially taken out (Step S22), and the preselection setting process therefore is implemented (Step S23).

Search Process for the Base Program

In accordance with the content operations such as watching, recording, and preselected recording on the CE device, the broadcast date and time and the broadcast station of the base program are extracted as program specification information, the base program is specified based on program specification information, and the base program related information page related to the base program is created. Thus, the services described above can be developed.

However, it is likely to present the base program related information page shifted before and after on a time basis. The situations below can be considered as the cases where the base program related information page shifted before and after on a time basis is presented.

(1) The case where a user finishes watching a program and desires to make access, but the program has already been switched on the EPG. In this case, it is the correct operation on design, but when seen from the viewpoint of the user, the user can have the impression that the program the user desires to watch is not displayed, but the base program related information page for the subsequent program is displayed.

(2) The case where time setting of the terminal is incorrect to delay time in the terminal. In this case, at the point in time when information about the base program is up to the server, time information of the base program is incorrect in matching time information of the base program with EPG information. Therefore, it is likely to detect a wrong program.

Then, in the embodiment, a function is provided in which a proper base program is searched and shifted in response to the user input operation to search the base program on the display screen of the base program related information page.

Figure 29:
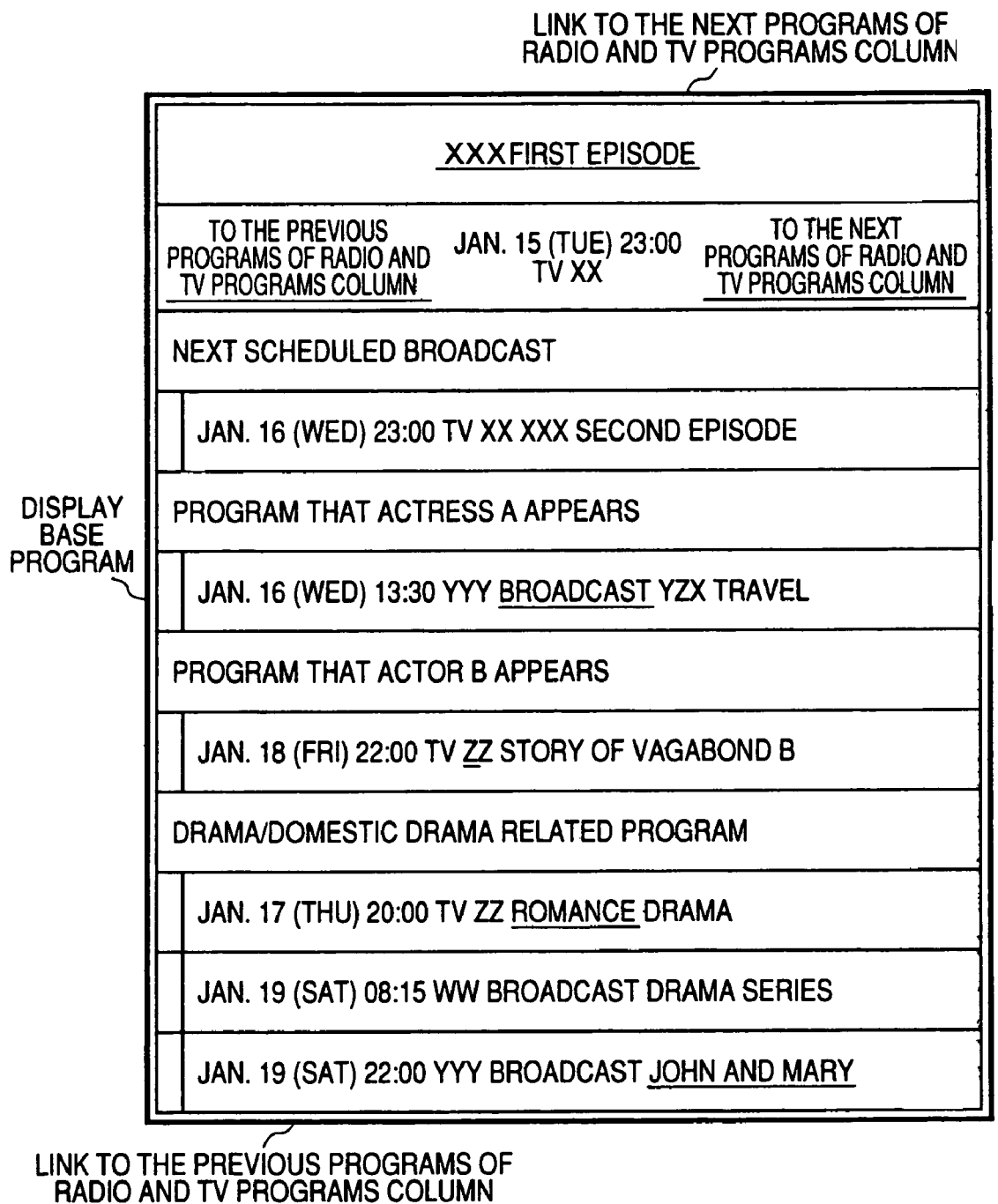
FIG. 29 is a diagram depicting an exemplary configuration of a base program related information page having a search function of a base program.

FIG. 29 depicts an exemplary configuration of a base program related information page having the search function for the base program.

A first example of the search function for the base program is backward search on a time basis. In response to the user operation of instructing backward search on the time basis, a program list such as the EPG is searched for the program in the same broadcast station as the base program currently set, having the maximum broadcast end date and time equal to below the current broadcast start date and time (see the following equation), and the base program is shifted to the program extracted here.

'the same broadcast station as the base program' and
'broadcast end date and time≦broadcast start
date and time of the base program' and 'broadcast end date and time is the maximum'

The backward search function is equivalent to a shift to the program right before on the program list (the radio and TV program column) of a newspaper where the horizontal axis is broadcast stations and the vertical axis is broadcast hours. In the example shown in the drawing, a link button of 'to the previous programs of the radio and TV program column' on the upper left of the screen is a trigger to activate the backward search function.

A second example of the search function for the base program is forward search on a time basis. In response to the user operation of instructing forward search on the time basis, a program list such as the EPG is searched for the program in the same broadcast station as the base program currently set, having the minimum broadcast start date and time equal to or above the current broadcast end date and time (see the following equation), and the base program is shifted to the program extracted here.

'the same broadcast station as the base program' and
  'broadcast start date and time≧broadcast end
  date and time of the base program' and 'broadcast start date and time is the minimum'

The forward search function is equivalent to a shift to the program right after on the program list (the radio and TV program column) of a newspaper where the horizontal axis is broadcast stations and the vertical axis is broadcast hours. In the example shown in the drawing, a link button of 'to the next programs of the radio and TV programs column' on the upper right of the screen is a trigger to activate the forward search function.

According to the search for TV programs of the embodiment, although the base program related information page shifted before and after on the time basis might be presented, the shift operation of the base program allows a shift to the base program related information page to be displayed originally. Moreover, for the user interested in the program shifted before and after on the time basis, the requested base program related information page can be presented.

Presentation of Broadcast Scheduled Programs on a Priority Basis

In the embodiment described above, the related programs are used in order of items having a decreasing relevance ratio with respect to the base program to create the base program related information page. However, suppose that the contents that have already been finished in broadcast or already recorded are not distinguished from the contents that are scheduled for broadcast and are not yet set for preselected recording, and they are evenly preselected only based on ranking of the relevance ratio. This is not always preferable as a recommendation and watching aid scheme with respect to volatile contents like the broadcast contents.

Then, in the embodiment, the base program related information page is created so that the latest programs to be scheduled for broadcast are presented on a priority basis. For example, a list in which programs are sorted in accordance with a certain criterion such as a ranking form is first created, the programs are filtered to those having a certain level (rank) or above on the list, and the programs having the latest broadcast schedule are rearranged for presentation. For example, the programs were filtered to those of the top three in the program preselected ranking, and the programs highly interested and the latest were presented on a priority basis.

FIG. 30 depicts an exemplary configuration of a program list based on the ranking result obtained by sorting programs in accordance with a certain criterion. However, the teachings of the invention here are not limited. The criterion for sorting is not limited particularly, which may be a degree of recommendation agreed by the server's priority, or may be priority levels set based on the user taste information on the CE device side, for example. In the example in the drawing, program entries are listed in accordance with order of ranking. Each of the program entries is configured of, for example, program titles, broadcast station names, channel numbers, broadcast start date and time, and broadcast end date and time.

Subsequently, the sorting result is limited to a predetermined number of top ranks (five ranks in this example), and the remaining program entries are deleted (see FIG. 31). The reason why the number of program entries is limited is because of the circumstances that many program entries remain to cause difficulty to see in the CE device with a small display area.

Figures 33, 34:
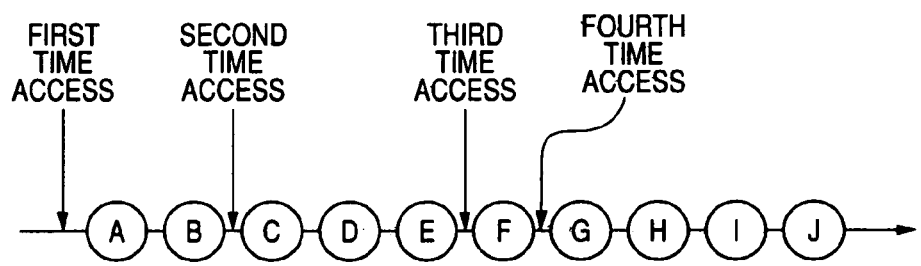
FIG. 33 is a diagram depicting an exemplary configuration of a base program related information page in which a broadcast schedule is rearranged to the latest broadcast schedule.
FIG. 34 is a diagram depicting a manner in which, as the result of ranking by a predetermined criterion, top broadcast programs A to J are further sorted on a time basis in order of broadcast scheduled time.

At the stage shown in FIG. 30 or 31, program entries are limited only to those to be scheduled for broadcast. Furthermore, the entries are rearranged in order of the latest broadcast schedule (see FIG. 32). Subsequently, the entries are filtered to top ranks, rearranged to those of the latest broadcast schedule, and then a base program related information page is created. FIG. 33 depicts an exemplary configuration of the base program related information page at this time. As shown in the drawing, programs are filtered to the top three in the program preselected ranking, and the programs highly interested and the latest are presented on a priority basis.

In this manner, the programs of the latest broadcast schedule are presented on a priority basis from among many programs, and thus efficient program presentation can be done even under the inherent limitation of the CE device with a small display area. This is because the programs of the latest broadcast schedule are presented on a priority basis, when a user makes access to the system on a regular basis. Thus, missing programs for display are reduced, and consequently, the number of programs presented for the user is increased.

FIG. 34 depicts a manner in which ranks are made by a predetermined criterion, and consequently broadcast programs A to J of top ranks are sorted in order of broadcast scheduled time on a time basis.

Here, suppose a user makes access to the base program related information page at the times shown in the drawing, where only three program entries are presented on the base program related information page for convenience of description.

As shown in FIG. 34, on the base program related information page, when programs of the latest broadcast schedule are presented on a priority basis, three entries A, B, and C are presented at the first time access, three entries C, D, and E are presented at the second time access, three entries F, G, and H are presented at the third time access, and three entries G, H, and I are presented at the fourth time access. Consequently, the program entry that has never been displayed on the base program related information page is only J.

On the other hand, on the base program related information page, when program entries are presented at random irrespective of the order of the broadcast schedule, three entries A, C, and G are presented at the first time access, three entries D, E, and H are presented at the second time access, three entries G, H, and I are presented at the third time access, and are presented at the fourth time access. In this case, the program entries that have never been displayed on the base program related information page are three entries B, F, and J, and the number of the program entries not displayed is clearly greater than the case of presenting programs of the latest broadcast schedule on a priority basis.

| | Display method | |
|---|---|---|
| Times | Showing a program in higher priority from the latest program | Showing a program at random |
| First access | A, B, C | A, C, G |
| Second access | C, D, E | D, E, H |
| Third access | F, G, H | G, H, I |
| Fourth access | G, H, I | G, H, I |
| Result | J has never been displayed | B, F, J have never been displayed |

Supplemental

As described above, the invention has been described in detail with reference to the specific embodiment. However, it is apparent that persons skilled in the art can modify and substitute the embodiment in the scope without deviating from the teachings of the invention. More specifically, the invention has been disclosed in the exemplified form, which should not be interpreted limitedly. In order to determine the teachings of the invention, the claims should be referred to.

According to the invention, an excellent information processing apparatus, an information processing method, and a computer program can be provided which can preferably aid content processing such as TV program recording, preselected recording, and playback.

Furthermore, according to the invention, in consideration of the nature of TV program watching that is passive entertainment, an excellent information processing apparatus, an information processing method, and a computer program can be provided which can preferably aid content operations such as TV program search, preselected recording, and playback.

Moreover, according to the invention, without deadening a user's interest inspired by watching a TV program, an excellent information processing apparatus, an information processing method, and a computer program can be provided which can preferably aid content operations such as TV program search, preselected recording, and playback.

Besides, according to the invention, without deadening a user's interest inspired by watching a TV program, an excellent information processing apparatus, an information processing method, and a computer program can be provided which can provide program related information related to a program watched by the user, and can preferably aid content operations such as TV program search, preselected recording, and playback, and the other user' activities.

The invention claimed is:

1. An information processing apparatus which provides information related to program content distributed in accordance with scheduled times, the information processing apparatus comprising:
   a receiver having a processing unit operable to set particular program content as a base program in accordance with an operation by a user with respect to the program content, and to control transmission of program specification information related to at least a portion of the base program; and
   a server operable to receive the transmitted program specification information related to the at least portion of the base program, to manage, for each one of a plurality of portions of programs, program information related to that program portion and formed of multiple items by assigning to each such item an associated relevance ratio with respect to the at least portion of the base program, the plurality of portions of programs including portions containing broadcast commercials that are inserted between other portions containing program content, the program information including program information related to the portions containing broadcast commercials, to search for those program portions whose program content is related to the at least portion of the base program based on the relevance ratios, to arrange a search result of the related program portions in order of items having a decreasing relevance ratio with respect to the at least portion of the base program, to create a base program related information page that displays program information related to the base program and that displays, for each program portion in the arranged search result, the programs which include that portion, and in response to a particular program being contained multiple times in the base program related information page, to manage the base program related information page to display that program at most a predetermined number of times;
   the server being operable to further manage the program information by assigning an associated further relevance ratio with respect to a user's liking to each one of the related programs in the search result that is determined from user content operation history and user questionnaire results;
   the server being operable to further manage the base program related information page by separating out a predetermined number of programs from the related programs of the search result, the predetermined number of programs being those having a highest further relevance ratio with respect to the user's liking, and rearranging the predetermined number of separated out programs in order of decreasing further relevance ratio, to control the display of the base program related information page, and to control output of the base program related information page;
   the processing unit of the receiver being operable to control acceptance of a user selection of a related program or item of the base program on the displayed base program related information page, and to control presentation of a detail operation screen that includes an operation scheme applicable to detail information for the related program selected by the user and/or the related program.

2. The information processing apparatus according to claim 1, wherein the processing unit of the receiver is operable to set as the base program content that the user is playing back or watching, or program content selected from a predetermined program list.

3. The information processing apparatus according to claim 1, wherein the processing unit of the receiver is operable to automatically extract the program specification information related to the base program; and the server is operable to specify the base program based on the program specification information related to the base program and to create the base program related information page including program information related to the specified base program.

4. The information processing apparatus according to claim 3, wherein the processing unit of the receiver is operable to extract a program ID related to the base program as the program specification information.

5. The information processing apparatus according to claim 3, wherein the processing unit of the receiver is operable to extract as the program specification information any one of items of information that specify at least a broadcast date and time and a broadcast station of the base program, and an area to receive content.

6. The information processing apparatus according to claim 1, wherein the server is operable to manage the program information so that program association schemes are subdivided into multiple items for each of the program content.

7. The information processing apparatus according to claim 6, wherein the server is operable to manage the program information so as to assign a relevance ratio with respect to the base program in order of 'next broadcast schedule', 'cast', 'title', and 'genre'.

8. The information processing apparatus according to claim 1, wherein when the same program content are extracted as a related program for the base program on two or more items, the server is operable to omit display of the related programs after a second time.

9. The information processing apparatus according to claim 1, wherein the server is operable to control and adjust the number of related programs for each item for display and output in a fixed page size.

10. The information processing apparatus according to claim 1, wherein the processing unit of the receiver is operable to control receiving program content, and to control recording/preselecting for recording the received program content, the operation scheme applicable to each of the related programs includes one or more preselected recording schemes, and the operation scheme sets preselected recording for the related program based on the recording scheme selected through the detail operation screen for the related program.

11. The information processing apparatus according to claim 10, wherein the preselected recording scheme includes: a scheme that collectively sets all the related programs arranged on the base program related information page for preselected recording; and a scheme that collectively sets the program selected by the user for preselected recording.

12. The information processing apparatus according to claim 1, wherein the server is operable to register the item selected by the user on the displayed base program related information page as a keyword.

13. The information processing apparatus according to claim 1, wherein the processing unit of the receiver is operable to shift the base program in response to a user operation, and the server is operable to again create a base program related information page in response to the shift of the base program.

14. The information processing apparatus according to claim 13, wherein when a related program is selected as a base program on the detail operation screen, the processing unit of the receiver shifts the base program to the related program.

15. The information processing apparatus according to claim 13, wherein when a related program is set for preselected recording on the detail operation screen, the processing unit of the receiver sets the related program to a base program.

16. The information processing apparatus according to claim 13, wherein when a related program is set for playback on the detail operation screen and playback operation is stopped or finished, the processing unit of the receiver sets the related program to a base program.

17. The information processing apparatus according to claim 13, wherein the processing unit of the receiver is operable to hold the history in which the base program has been shifted by a base program shifting module, and to reproduce an original base program related information page based on the held history.

18. The information processing apparatus according to claim 13, wherein the processing unit of the receiver is operable to accept a user instruction to search for the base program on a display screen of the base program related information page, and in response to a user operation, searches for the base program and shifts the base program based on a predetermined search condition.

19. The information processing apparatus according to claim 18, wherein in response to a user operation to conduct a forward search on a time basis, the processing unit of the receiver searches for a program in the same broadcast station as the base program currently set, having a maximum broadcast end date and time equal to or below a current broadcast start date and time, and shifts the base program.

20. The information processing apparatus according to claim 18, wherein in response to a user operation to conduct a backward search on a time basis, the processing unit of the receiver searches for a program in the same broadcast station as the base program currently set, having a minimum broadcast start date and time equal to or above a current broadcast end date and time, and shifts the base program.

21. The information processing apparatus according to claim 1, wherein the server is operable to create a base program related information page which presents programs of the latest broadcast schedule on a priority basis.

22. The information processing apparatus according to claim 21, wherein the server is operable to sort related programs to the base program in accordance with a predetermined criterion, to arrange a predetermined number of top programs of the related programs in order of the latest broadcast schedule, and to create a base program related information page.

23. The information processing apparatus according to claim 1, wherein when a predetermined condition is matched on the base program related information page, a special content is presented.

24. The information processing apparatus according to claim 1, wherein the server is operable to manage information associated with all of a particular program or a given portion of that program, and in response to a content operation by a user, the processing unit of the receiver extracts as the program specification information any one of items of information that specify at least a broadcast date and time and a broadcast station of a base program, and an area to receive content, and a base program information creating module takes from the server program information associated with the at least portion of the base program where the content operation is performed by the user based on the program specification information, and uses the program related information to create a base program related information page.

25. The information processing apparatus according to claim 24, wherein the server is operable to create a base program related information page which uses at the same time program information associated with all of the base program and program information associated with a specific portion of the base program.

26. The information processing apparatus according to claim 24, wherein the server is operable to manage resource identification information on a predetermined information space which accesses the information associated with all of the particular program or a given portion of that program, to use the resource identification information based on the program specification information, to search program related information on the predetermined information space, and to create a base program related information page.

27. The information processing apparatus according to claim 24, wherein the server is operable to manage keyword information related to all of the particular program or a given portion of that program, to use the keyword information based on the program specification information, to search program related information on a predetermined information space, and to create a base program related information page.

28. The information processing apparatus according to claim 24, wherein the server is operable to manage related information about another portion of the particular program, a program different from the particular program, or a given portion of the different program as information related to an entire program or a given portion of the program, and in response to a user operation with respect to the related information about the another portion of the particular program, the different program, or the given portion of the different program on a base program related information page, the server activates playback of the another portion of the particular program, the different program or the given portion of the different program.

29. The information processing apparatus according to claim 1, wherein the server is operable to search for information associated with a particular program or program portion being watched or played back, and to present indication information that indicates to a user on a screen when the associated information is found.

30. The information processing apparatus according to claim 1, wherein the server is operable to present related information matched with user taste information.

31. An information processing method which provides information related to program content distributed in accordance with scheduled times, the information processing method comprising:

setting particular program content to be a base program;

receiving transmitted program specification information related to at least a portion of the base program;

managing, for each one of a plurality of portions of programs, program information related to that program portion and formed of multiple items by assigning to each such item an associated relevance ratio with respect to the at least portion of the base program, the plurality of portions of programs including portions containing broadcast commercials that are inserted between other portions containing program content, the program information including program information related to the portions containing broadcast commercials;

searching for those program portions whose program content is related to the at least portion of the base program based on the relevance ratios;

arranging a search result of the related program portions in order of items having a decreasing relevance ratio with respect to the at least portion of the base program;

creating a base program related information page that displays program information related to the base program and that displays, for each program portion in the arranged search result, the programs which includes that related portion;

managing the base program related information page, in response to a particular program being contained multiple times in the base program related information page, to display that program at most a predetermined number of times;

further managing the program information by assigning an associated further relevance ratio with respect to a user's liking to each one of the related programs in the search result that is determined from user content operation history and user questionnaire results;

further managing the base program related information page by separating out a predetermined number of programs from the related programs of the search result, the predetermined number of programs being those having a highest further relevance ratio with respect to the user's liking, and rearranging the predetermined number of separated out programs in order of decreasing further relevance ratio;

displaying and outputting the base program related information page;

accepting a user selection of a related program or item of the base program on the displayed base program related information page; and presenting a detail operation screen that includes an operation scheme applicable to detail information for the related program selected by the user and/or the related program.

32. A non-transitory recording medium recorded with a computer program for causing a processor to perform a method of providing information related to program content distributed in accordance with scheduled times, the method comprising:

setting particular program content to be a base program;

receiving transmitted program specification information related to at least a portion of the base program;

managing, for each one of a plurality of portions of programs, program information related to that program portion and formed of multiple items by assigning to each such item an associated relevance ratio with respect to the at least portion of the base program, the plurality of portions of programs including portions containing broadcast commercials that are inserted between other portions containing program content, the program information including program information related to the portions containing broadcast commercials;

searching for those program portions whose program content is related to the at least portion of the base program based on the relevance ratios;

arranging a search result of the related program portions in order of items having a decreasing relevance ratio with respect to the at least portion of the base program;

creating a base program related information page that displays program information related to the base program and that displays, for each program portion in the arranged search result, the programs which includes that related portion;

managing the base program related information page, in response to a particular program being contained multiple times in the base program related information page, to display that program at most a predetermined number of times;

further managing the program information by assigning an associated further relevance ratio with respect to a user's liking to each one of the related programs in the search result that is determined from user content operation history and user questionnaire results;

further managing the base program related information page by separating out a predetermined number of programs from the related programs of the search result, the predetermined number of programs being those having a highest further relevance ratio with respect to the user's liking, and rearranging the predetermined number of separated out programs in order of decreasing further relevance ratio;

displaying and outputting the base program related information page;

accepting a user selection of a related program or item of the base program on the displayed base program related information page; and presenting a detail operation screen that includes an operation scheme applicable to detail information for the related program selected by the user and/or the related program.

* * * * *